United States Patent
Hein et al.

(10) Patent No.: US 9,951,394 B2
(45) Date of Patent: Apr. 24, 2018

(54) HIDE ROUTING SYSTEMS AND METHODS

(71) Applicant: National Beef Packing Company, LLC, Kansas City, MO (US)

(72) Inventors: Robert Horst Hein, Kansas City, MO (US); Kenneth Graham Press, Kansas City, MO (US); Shaun Francis Gleeson, Kansas City, MO (US)

(73) Assignee: National Beef Packing Company, LLC, Kansas City, MO (US)

( * ) Notice: Subject to any disclaimer, the term of this patent is extended or adjusted under 35 U.S.C. 154(b) by 0 days.

(21) Appl. No.: 14/714,006

(22) Filed: May 15, 2015

(65) Prior Publication Data

US 2015/0344979 A1 Dec. 3, 2015

Related U.S. Application Data

(60) Provisional application No. 62/003,998, filed on May 28, 2014.

(51) Int. Cl.

| | | |
|---|---|---|
| *C14B 17/00* | (2006.01) | |
| *C14C 1/06* | (2006.01) | |
| *B07C 5/16* | (2006.01) | |
| *B07C 5/38* | (2006.01) | |
| *B07C 5/34* | (2006.01) | |
| *G05B 19/41* | (2006.01) | |
| *B65G 57/02* | (2006.01) | |
| *C14B 1/14* | (2006.01) | |
| *C14C 3/06* | (2006.01) | |
| *C14C 15/00* | (2006.01) | |
| *B65G 57/00* | (2006.01) | |
| *C14C 3/00* | (2006.01) | |
| *G05B 19/418* | (2006.01) | |
| *G06Q 30/06* | (2012.01) | |

(52) U.S. Cl.
CPC .............. *C14B 17/005* (2013.01); *B07C 5/16* (2013.01); *B07C 5/34* (2013.01); *B07C 5/38* (2013.01); *B65G 57/00* (2013.01); *B65G 57/02* (2013.01); *C14B 1/14* (2013.01); *C14C 1/06* (2013.01); *C14C 3/00* (2013.01); *C14C 3/06* (2013.01); *C14C 15/00* (2013.01); *G05B 19/4189* (2013.01); *G06Q 30/0621* (2013.01); *G05B 2219/39106* (2013.01)

(58) Field of Classification Search
CPC .... G06Q 30/0621; C14B 17/005; C14B 1/28; C14B 1/14; C14C 1/06; C14C 3/06; C14C 15/00; B07C 5/16; B07C 5/34; B07C 5/38; G05B 19/4189; G05B 2219/39106; B65G 57/02; B65G 57/00
See application file for complete search history.

(56) References Cited

FOREIGN PATENT DOCUMENTS

EP 0354009 * 2/1990

* cited by examiner

*Primary Examiner* — Amina Khan
(74) *Attorney, Agent, or Firm* — Seth Black; Dodd Call Black, PLLC

(57) ABSTRACT

Methods and systems for processing raw animal hides into leather are provided. In particular, one or more embodiments comprise a tanning manager that directs the routing of hides to a plurality of tanning drums. This allows the tanning manager to efficiently use the capacity of the plurality of tanning drums and provides improved consistency in the tanning of the hides. Furthermore, one or more embodiments enable the tanning manager to route hides to tanning drums based on various factors, such as hide type, hide weight, and hide size. In addition, one or more embodiments provide the tanning manager with greater control over the processing of hides into leather by customizing the tanning recipes applied to each batch of hides.

13 Claims, 11 Drawing Sheets

| Batch ID | Batch Weight (TONS) | Batch Hide Count | Batch Hide Type | Liming Drum ID | Chroming Drum ID | Container IDs | Transport Vehicle ID | Plant ID |
|---|---|---|---|---|---|---|---|---|
| 100011 | 8.00 | 285 | Jumbo | 6 | 14 | 1-12 | 1NKWGGGG80J066189 | Liberal |
| 100012 | 7.27 | 260 | Jumbo | 10 | 18 | 13-23 | 1NKWGGGG80J066189 | Liberal |
| 100013 | 7.8 | 355 | Heifer | 7 | 10 | 51-57 | 1XKTDR9X0XJ793590 | Brawley |
| 100014 | 7.5 | 280 | Steer | 19 | 1 | 1-8 | 3NKMHD7X0WF756859 | Dodge |

*Fig. 4*

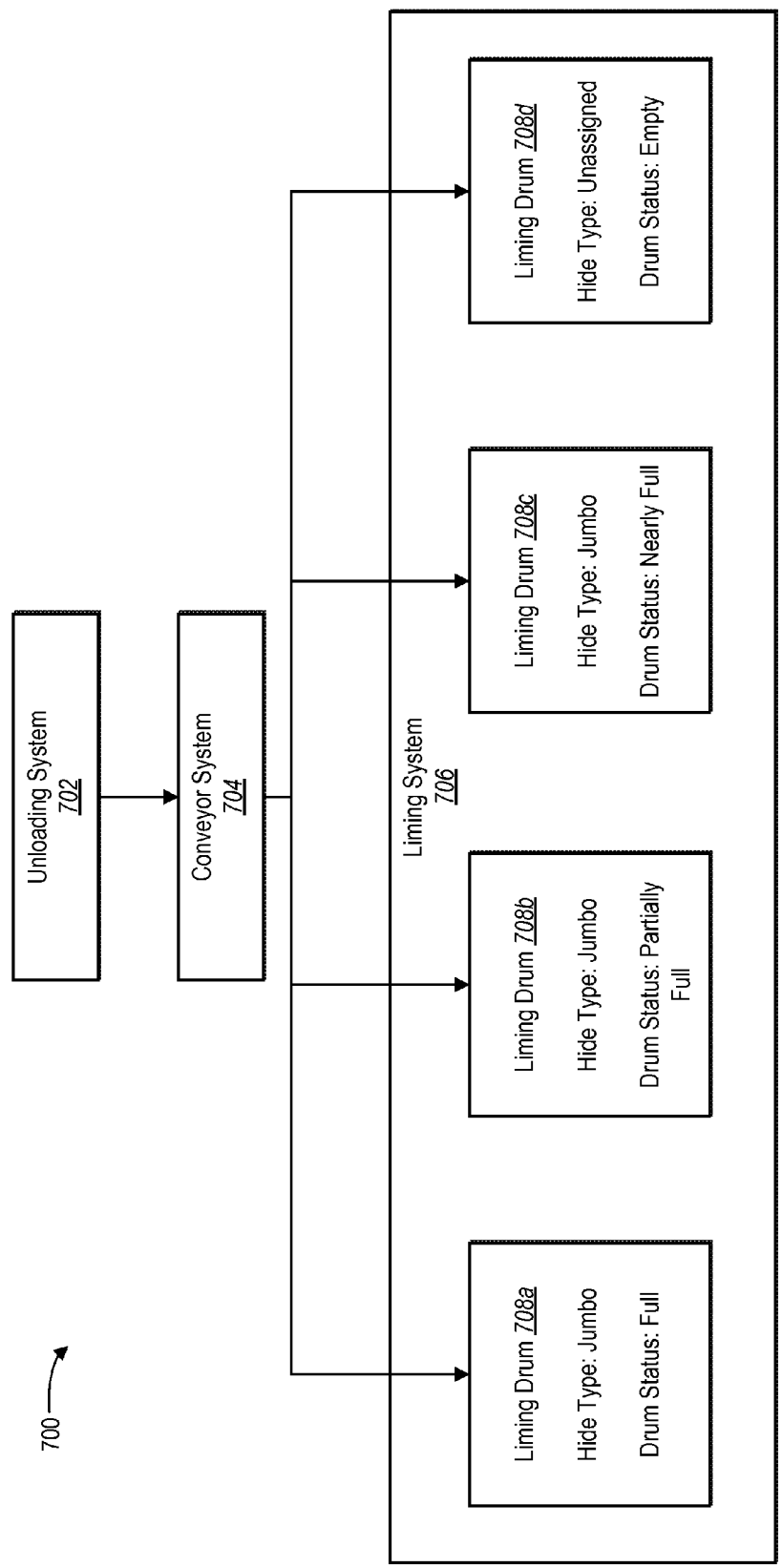

HIDE ROUTING SYSTEMS AND METHODS

CROSS REFERENCE TO RELATED APPLICATIONS

This application claims priority to and the benefit of U.S. Provisional Application No. 62/003,998 filed May 28, 2014. The entire content of the foregoing application is hereby incorporated by reference in its entirety.

BACKGROUND

1. Technical Field

One or more embodiments relate generally to processing animal hides. More specifically, one or more embodiments relate to systems and methods of processing raw animal hides into leather.

2. Background and Relevant Art

In general, tanning is the process of transforming raw animal hides into leather. More specifically, tanning involves treating animal hides with certain chemicals that prevent the hides from decaying and make the hides more supple and durable. Most often, raw animal hides come from slaughterhouses that slaughter animals to harvest animal meat. However, in other cases raw animal hides may come from other facilities, such as knackeries or tanneries that slaughter and skin various animals for a variety of reasons. Thus, while the vast majority of leather is made from the hides of bovine (e.g., cattle), ovine (e.g., sheep), porcine (e.g., pigs), and caprine (e.g., goats) animals, a wide assortment of leather is also produced from the hides of various other animals, such as deer, bison, buffalo, ostrich, kangaroo, crocodile, alligator, snake, eel, and stingray.

Following removal of the hides from the animals, curing is typically used to prevent decomposition of the raw animal hides before they are subjected to further tanning processes. Examples of curing include treating the raw animal hides with salt (e.g., by wet-salting or brine-curing the hides) or preserving the raw animal hides at a cold temperature (e.g., by packing the hides with ice). Accordingly, in most cases curing facilitates the preservation of the raw animal hides while they are transported from a slaughterhouse to a tannery.

Once received at a tanning facility, the animal hides are usually subjected to various processes that remove non-leather forming substances (e.g., hair and fat) from the hides. Such processes are generally referred to as beamhouse operations. Typically, beamhouse operations may include trimming, soaking, fleshing, unhairing, liming, bating, deliming, and pickling processes. Trimming is performed to remove unwanted or unusable portions of the animal hides. Soaking is used to make the hides more soft and flexible by reintroducing water into the hides that may have been lost due to curing. Fleshing is performed to facilitate the penetration of chemicals into the hides by removing fat and other substances from the hides. Fleshing may also be used to shape the hides to conform to a uniform thickness. Unhairing removes hair and other non-leather forming substances from the hides typically by treating the hides with specific chemicals. Usually, liming is the most common method of unhairing. However, thermal, oxidative, and other chemical methods of hair removal are known, and a mechanical process of unhairing, called scudding, is also sometimes used. Liming is also employed to swell and break up certain tissue fibers in the hides, as well as prepare the collagen in the hides for proper tanning. Bating and deliming usually involves treating the hides with certain enzymes that remove undesirable components of the tissue of the hides, thereby making the hides softer and more stretchy and flexible. Oftentimes, pickling is used to preserve the hides or prepare the hides for tanning by changing the acidity of the hides.

Following the beamhouse operations described above, the animal hides are typically tanned using one of two chemical tanning processes, chrome tanning or vegetable tanning, which create a reaction between collagen fibers of the hides and certain chemical tanning agents. Chrome tanning usually involves treating the hides with chromium, whereas vegetable tanning usually involves treating the hides with vegetable tannins. Other tanning agents may also be used, such as alum, syntans, formaldehyde, glutaraldehyde, and heavy oils. Once chrome tanning or vegetable tanning of the hides is complete, the tanned hides may be processed further before being made into finished leather. Further processing usually involves wringing, grading, splitting, and shaving of the tanned hides. After any further processing is completed, the tanned hides are ordinarily subjected to retanning, coloring, fatliquoring, and finishing processes that generate finished leather from the hides.

Typical tanning systems and methods involve significant amounts of time consuming manual labor. For instance, typical tanning systems and methods include manual unloading, loading, and transporting of animal hides to and from areas of a tanning facility that perform various tanning processes, such as beamhouse operations and chemical tanning processes. For example, tannery workers may manually unload raw animal hides from containers used to transport the hides to the tanning facility. Similarly, tannery workers often manually load animal hides into drums that perform the liming and chemical tanning processes, as well as other machines that aid in carrying out other tanning processes, such as fleshing machines. As a further example, tannery workers may manually transport hides (e.g., using rolling carts) to liming drums, fleshing machines, and chemical tanning drums. Conventional tanning systems may also use manual labor to separate, measure, sort, route, deflesh, and chemically treat the hides at the appropriate time during the tanning process.

Due, at least in part, to the significant amount of manual labor involved, conventional tanning systems have several disadvantages. For example, the manual handling of hides throughout conventional tanning systems is inefficient and time consuming, which increases the expense of a tanning process. For example, the manual unloading, loading, and transporting of hides oftentimes is unpredictable, and therefore contributes to a lack of coordination among various tanning processes in a tanning facility. In particular, workers in a tanning facility may manually unload raw hides from a transportation vehicle at a faster rate than they can manually transport and load the hides into liming drums or chemical tanning drums, resulting in an undesirable buildup of raw animal hides. As an alternative example, workers in a tanning facility may unload hides from a transportation vehicle at a slower rate than they can manually transport and load the hides into liming drums or chemical tanning drums, thereby causing unwanted underutilization of those drums. The lack of coordination and precise control over tanning processes within typical tanning facilities is inefficient and expensive.

Additionally, the manual handling of hides throughout a typical tanning process may often cause damage to the hides. For example, tanning workers may inadvertently damage hides during the manual handling of the hides, causing unwanted nicks, cuts, or scrapes. Oftentimes, damage caused by the manual handling of hides leads to less valuable tanned hides, thereby resulting in a loss in the monetary value of the hides and ultimately reduced profit for the tannery facility operator. Further, such damage also typically leads to tanned hides of inconsistent quality, thereby giving rise to limited uses for the hides and diminished customer satisfaction.

Furthermore, due to relying on manual processes, it is common for conventional tanning facilities to apply the same tanning processes to all hides, regardless of particular hide characteristics. More specifically, it is common to use the same liming and chemical tanning recipes for all hides, despite differences in hide characteristics, such as hide weight, size, or type. Applying the same liming and chemical tanning recipes to all hides typically leads to lower quality tanned hides that may require further manual treatment to become sufficiently tanned into leather. For example, some hides subjected to the same liming and chemical recipes may be "under-tanned" (i.e., insufficiently subjected to the liming and chemical tanning processes) or "over-tanned" (i.e., excessively subjected to the liming and chemical tanning processes). Such "under-tanned" or "over-tanned" hides may receive lower hide grades, resulting in less valuable hides and reduced profits for the tanning facility operator.

Due to conventional tanning facilities not accounting for specific hide characteristics, such facilities often commingle hides of different characteristics. For example, conventional tanning facilities typically commingle heifer, steer, and jumbo type hides and subject these commingled hides to the same tanning processes. In some instances, applying the same tanning processes to commingled hides results in "over-tanned" heifer type hides and "under-tanned" jumbo type hides. For example, a heifer type hide may be more optimally tanned by a first tanning process tailored to heifer hides (e.g., a first liming recipe and a first chemical tanning recipe), whereas a jumbo type hide may be more optimally tanned by a second tanning process tailored to jumbo hides (e.g., a second liming recipe and a second chemical tanning recipe). Thus, the commingling and treating of different types of hides may create inconsistently tanned hides, which ultimately results in a product that is less satisfactory for customers.

Additionally, the manual handling of hides in a tanning facility may make it difficult to trace hides throughout the tanning processes. The inability to sufficiently track hides through a tanning process reduces the ability to identify and troubleshoot problems in a conventional tanning process. Moreover, such a lack of traceability causes further difficulties in optimizing a tanning process. The inability to troubleshoot and optimize a tanning process causes conventional tanning systems to produce lower quality products, often at a higher cost.

Accordingly, there are a number of considerations to be made in processing raw animal hides into leather.

SUMMARY

Embodiments disclosed herein provide benefits and/or solve one or more of the foregoing or other problems in the art with systems and methods for improving the processing of raw animal hides into leather. More specifically, one or more embodiments can reduce the amount of manual handling of hides throughout a hide tanning process. In addition, one or more embodiments provide systems and methods to improve coordination among the various tanning processes, enhance the consistency of leather generated by such processes, and provide a measure of traceability throughout the various tanning processes.

For example, one or more embodiments provide systems and methods that automate the unloading, loading, and transporting of animal hides once the raw hides are received at a tanning facility. More specifically, the systems and methods disclosed herein can provide an unloading system that controls and performs the unloading of raw hides from transport containers. Further, in one or more embodiments, an unloading system can automatically measure and separate the hides individually, without the need for human intervention.

Moreover, one or more embodiments can provide one or more conveyor systems that automate the loading and unloading of hides to and from liming drums and chemical tanning drums, as well as the transport of the hides throughout the tannery facility. In one or more embodiments, one or more conveyor systems can operate in coordination with an unloading system to automate the sorting and routing of hides to the liming drums and chemical tanning drums. Accordingly, one or more embodiments can improve efficiency, reduce the costs associated with unloading, loading, and transporting hides within a tannery, and reduce the potential for damage to the hides arising from manual handling.

Additionally, one or more embodiments can coordinate and manage the various systems, machinery, and processes of a tannery facility. For example, one or more embodiments can provide a tanning manager that manages the unloading, loading, transport, liming, fleshing, and chemical tanning processes of the tannery facility. Further, one or more embodiments of a tanning manager can coordinate and manage the pace of unloading hides from transport containers and transporting and loading the hides into liming drums and chemical tanning drums, thereby reducing the possibility of an undesirable buildup of hides or underutilization of the tannery drums. Also, one or more embodiments of a tanning manager can ensure that liming drums and chemical tanning drums are loaded to capacity with hides. Consequently, one or more embodiments of the systems and methods disclosed herein can ensure the efficient and cost-effective use of tannery systems, machinery, and processes.

Moreover, one or more embodiments of the systems and methods disclosed herein can customize tanning processes based on particular hide characteristics. For example, systems and methods described herein can adjust the liming and chemical tanning processes (e.g., chemical recipes and process times) based on the weight of hides loaded into respective liming drums or chemical tanning drums. One or more embodiments can also reduce the possibility of commingling hides with different characteristics by separating, sorting, and routing hides based on particular characteristics, such as hide weight, size, or type. Accordingly, one or more embodiments provide hides that are more consistently tanned, thereby resulting in greater customer satisfaction.

Furthermore, one or more embodiments can provide improved traceability of hides throughout the tanning processes. For example, one or more embodiments can organize hides into batches based on certain common hide characteristics, such as hide type, and then associate tannery process information with those batches. In one or more embodiments, tannery process information for a batch can include a batch identifier, batch weight, a number of hides, a type of hides, a liming drum identifier, a chemical tanning drum identifier, one or more container identifiers, a transport vehicle identifier, and a plant or slaughterhouse identifier.

Thus, one or more embodiments provide improved traceability by detecting and storing information relating to the tanning processes applied to the hides. The improved traceability resulting from the systems and methods described herein make it easier to troubleshoot problems that may arise with any tanning processes and allows a tannery to produce a more consistent tanned leather product.

Additional features and advantages of exemplary embodiments will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description, or may be learned by the practice of such exemplary embodiments as set forth hereinafter.

BRIEF DESCRIPTION OF THE DRAWINGS

In order to describe the manner in which the above recited and other advantages and features can be obtained, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots, etc.) may be used to illustrate optional features or operations that add additional features to one or more embodiments. Such notation, however, should not be taken to mean that these are the only options or optional operations, and/or that blocks with solid borders are not optional in certain embodiments. Understanding that these drawings depict only typical embodiments and are not therefore to be considered to be limiting, such embodiments will be described and explained with additional specificity and detail through the use of the accompanying drawings in which:

FIG. 4 illustrates exemplary portions of a tanning system database in accordance with one or more embodiments;

FIG. 7A illustrates a schematic diagram for unloading, conveying, and routing hides to one or more liming drums in a tanning system in accordance with one or more embodiments;

DETAILED DESCRIPTION

Figure 1:
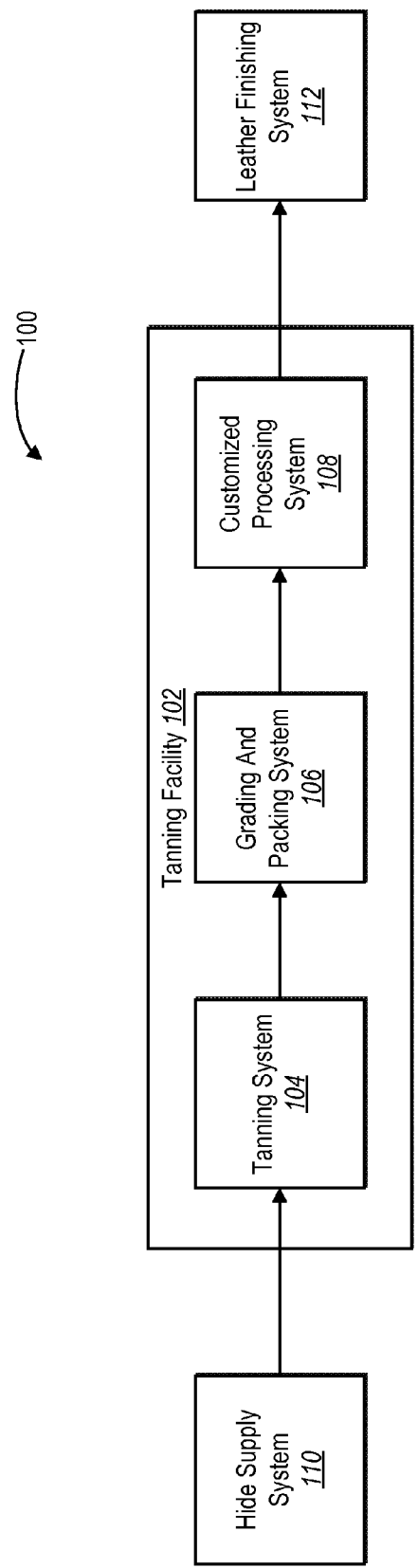
FIG. 1 illustrates a schematic diagram of a system for processing raw animal hides into leather in accordance with one or more embodiments.

One or more embodiments improve the processing of raw animal hides into leather. In particular, one or more embodiments include a tanning system that reduces the amount of manual labor needed to unload raw animal hides from transport containers used to ship the hides to the tannery. More specifically, example tanning systems include an unloading system that includes a computerized unloading controller that controls one or more unloading sites. Each unloading site includes an unloader (e.g., a hydraulic lift) that unloads the hides from the transport containers, a measurer (e.g., a weight scale) that determines one or more hide characteristics, and a separator (e.g., a knock-down wheel mechanism) that separates an amalgamation of the hides into individual hides. One or more embodiments of a tanning system also include a computerized unloading manager that communicates with the computerized unloading controller to direct and coordinate the unloading of the raw animal hides from the transport containers.

Furthermore, after the unloading system unloads the hides from the transport containers, one or more embodiments of a tanning system reduce the amount of manual labor needed to transport and load raw animal hides as may be necessary to carry out the various tanning processes. Specifically, one or more embodiments of a tanning system include a computerized conveyor controller that controls one or more conveyor systems that transport and load hides into one or more liming drums, fleshing machines, and/or chemical tanning drums (e.g., chroming drums). One or more embodiments of a tanning system also include a computerized conveyor manager that communicates with the computerized conveyor controller to direct and coordinate the transportation and loading of the hides.

Additionally, one or more embodiments of a tanning system improve the processing of raw animal hides into leather by facilitating greater coordination between the various tanning processes. In particular, example tanning systems include a computerized tanning manager that oversees and coordinates the various machinery and processes of a tannery. For example, in one or more embodiments the computerized tanning manager includes an unloading manager and a conveyor manager. Accordingly, the computerized tanning manager manages the unloading, loading, and transporting systems and processes.

Further, one or more embodiments of the computerized tanning manager includes a liming manager, fleshing manager, chemical tanning manager (e.g., chroming manager), batch manager, and chemical manager, thereby enabling the computerized tanning manager to coordinate the liming, fleshing, and chemical tanning (e.g., chroming) processes of the tannery. Thus, in one or more embodiments, the computerized tanning manager improves coordination of various tanning processes by communicating with, supervising, and directing various computerized controllers that more directly control tannery machinery and processes.

Moreover, one or more embodiments improve the processing of raw animal hides into leather by providing a tanning process that produces more consistently tanned hides compared to conventional tanning processes. Specifically, one or more embodiments of the tanning process improve tanning consistency by grouping hides with similar characteristics into a batch, and routing hides within the batch to the liming drums and chemical tanning drums that correspond to the hide characteristics. For example, one or more embodiments of the tanning process determine a hide type and weight for a plurality of hides and then route the plurality of hides, as part of a batch, to a particular liming or chemical tanning drum. Alternatively or additionally, one or more embodiments of the tanning process separate out each hide individually, determine a hide type and weight for each individual hide, and then route each individual hide to a particular liming and chemical tanning drum based on each individual hide's characteristics. Furthermore, one or more embodiments of the tanning process improve tanning consistency by dynamically adjusting the liming and chemical tanning recipes for a particular batch of hides according to the characteristics of the hides in that batch.

Furthermore, one or more embodiments improve the processing of raw animal hides into leather by providing for the traceability of hide batches, which is achieved by receiving, detecting, generating, and/or storing hide batch information (i.e., tannery process information). In particular, in one or more embodiments hide batch information can be used to further refine various tanning processes to obtain greater efficiency and consistency. For example, fully or partially tanned batches of hides can be inspected to determine quality, and if problems with quality exist, then the stored hide batch information can be used to troubleshoot the tanning process. As another example, stored hide batch information can be used to dynamically modify various tanning processes, such as the liming recipe of the liming process or the chemical tanning recipe of the chemical tanning process.

For example, FIG. 1 is a schematic diagram illustrating a tannery system 100 (or simply "system 100") for processing raw animal hides into leather in accordance with some embodiments. An overview of system 100 will be described next in relation to FIG. 1. Thereafter, a more detailed description of the components and processes of system 100 will be described in relation to the remaining figures.

As illustrated by FIG. 1, the system 100 can include a tanning facility 102. In one or more embodiments, the tanning facility 102 includes more or fewer systems, processes, machinery, and apparatuses, though in most embodiments the tanning facility 102 includes at least a tanning system 104. Further, in one or more embodiments, and as illustrated in FIG. 1, tanning facility 102 includes a grading and packing system 106 and/or a customized processing system 108. Moreover, as FIG. 1 illustrates, the system 100 can include a hide supply system 110 and/or a leather finishing system 112. As explained in greater detail below, each component 104-108 of the tanning facility 102, as well as components 110 and 112, can be managed and/or controlled by one or more computing devices.

In general, and as FIG. 1 illustrates, system 100 can include a hide supply system 110 that provides raw animal hides obtained from the slaughter of certain animals. For example, the hide supply system 110 provides raw animal hides to tanning system 104 of tanning facility 102. Tanning system 104 employs various tanning systems, processes, machinery, and apparatuses, to transform the raw animal hides into tanned hides. After the tanning system 104 produces tanned hides, a grading and packing system 106 receives the tanned hides and then grades, folds, stacks, and packs the tanned hides. After the tanned hides are graded and packed by grading and packing system 106, a customized processing system 108 can provide further processing (e.g., trimming and/or splitting) according to additional customized specifications (e.g., customer requirements). Following processing by customized processing system 108, a leather finishing system 112 produces finished leather from the tanned hides.

In one or more embodiments of system 100, hide supply system 110 can be a slaughterhouse. For example, hide supply system 110 can be a slaughterhouse for hooved livestock (e.g., cattle, sheep, pigs, goats, etc.) or a slaughterhouse for exotic animals (e.g., deer, bison, buffalo, ostrich, kangaroo, crocodile, alligator, snake, eel, and stingray). Alternatively, in one or more embodiments of system 100, hide supply system 110 can be a knackery (i.e., a facility where animals are not slaughtered for human consumption). Additionally, in one or more embodiments of system 100, hide supply system 110 can be part of, and physically located within, tanning facility 102.

Regardless of whether hide supply system 110 is a slaughterhouse, knackery, or a system within tanning facility 102, hide supply system 110 produces raw animal hides that can be tanned into leather by tanning facility 102. In one or more embodiments, hide supply system 110 obtains raw animal hides by skinning animals as part of the slaughtering process. Further, in one or more embodiments, hide supply system 110 can perform curing of the raw animal hides either by treating the raw animal hides with salt (e.g., by wet-salting or brine-curing the hides) or preserving the raw animal hides at a cold temperature (e.g., by packing the hides with ice). Moreover, in one or more embodiments, hide supply system 110 can pack the raw animal hides, whether cured or uncured, into transport containers, which are then loaded onto a transport vehicle (e.g., a semi-trailer truck) for delivery to tanning facility 102.

Additionally, in one or more embodiments hide supply system 110 can use one or more computing devices to generate and store hide supplier information to associate with hides that the hide supply system 110 provides. For example, hide supply system 110 can mark or otherwise associate a container of hides with various types of hide supplier information. In one or more embodiments, the hide supply system can generate a hide supplier information file to associate with a container of hides, provide access to the hide supplier information to the tanning facility 102, and tag the container (e.g., with a computer readable code such as a barcode) so that the tanning facility 102 can access the hide supplier information file upon receiving the container of hides (e.g., scanning a barcode and accessing the hide supplier information).

The hide supplier information can include various types of information. For example, the hide supplier information may include a plant identifier (e.g., a slaughterhouse name and/or location), transport vehicle identifiers (e.g., semi-trailer truck vehicle identification numbers or VINs), transport container identifiers (e.g., unique numerical identifiers), and a date of slaughter for the raw animal hides. In addition, the hide supplier information can include information related to the hide characteristics, such as hide type, packaged hide weight, pre-packed hide weight, source of hides (e.g., cattle ranch location) and any other hide characteristic. Accordingly, in one or more embodiments, hide supply system 110 can then use one or more computing devices to provide the hide supplier information to tanning facility 102 in order to facilitate greater traceability of hides and enable tanning facility 102 to further refine its tanning processes.

Alternatively or additionally, in one or more embodiments hide supply system 110 can provide hide supplier information in documentation that accompanies the transport vehicle and/or transport containers received by tanning facility 102. For example, in one or more embodiments hide supply system 110 can mark transport containers of raw animal hides with hide supplier information labels which can be read or input into one or more computing devices of tanning facility 102 (e.g., a batch database of a tanning manager as discussed in greater detail below). Accordingly, the input of hide supplier information from hide supply system 110 into one or more computing devices of tanning facility 102 enables traceability of hides from their origin. Thus, this level of traceability assists tanning facility 102 in troubleshooting problems or reducing inefficiencies in tanning processes that may be due to issues associated with a particular hide supply system 110.

As further illustrated by FIG. 1, one or more embodiments of system 100, and tanning facility 102 in particular, include a tanning system 104 that can receive raw animal hides from hide supply system 110. For example, in one or more embodiments, tanning system 104 can receive raw animal hides in transport containers shipped from hide supply system 110 to tanning facility 102 using a transport vehicle. Further, after receiving raw animal hides, tanning system 104 can transform the raw animal hides into leather. As an example, in one or more embodiments, tanning system 104 uses various systems, processes, machinery, and apparatuses to transform raw animal hides into wet-blue leather. As an alternative example, in one or more embodiments, tanning system 104 uses various systems, processes, machinery, and apparatuses to transform raw animal hides into wet-white leather.

Moreover, in one or more embodiments, tanning system 104 can generate and store tannery process information related to batches of raw animal hides and associate or incorporate hide supplier information into the tannery process information to provide improved traceability. Also, as discussed in greater detail below, tanning system 104 can use one or more computing devices to manage and control the various systems, processes, machinery, and apparatuses used to convert the raw animal hides into leather.

As FIG. 1 illustrates, one or more embodiments of tanning facility 102 include a grading and packing system 106. More specifically, in one or more embodiments grading and packing system 106 receives tanned hides produced by the tanning processes of tanning system 104. For example, grading and packing system 106 can receive tanned hides that are automatically transported from tanning system 104 to grading and packing system 106 (e.g., via a conveyor system). As an alternative example, grading and packing system 106 can receive tanned hides that are manually transported from tanning system 104 to grading and packing system 106 (e.g., via rolling carts).

Further, in one or more embodiments grading and packing system 106 grades the tanned hides received from tanning system 104. For example, grading and packing system 106 can grade the tanned hides using computer vision and machine learning techniques that assign a grade to each hide. Alternatively, grading and packing system 106 can grade the tanned hides manually using a human operator to inspect each hide and assign a grade to each hide.

The grading system used by grading and packing system 106 can be a national hide grading standard, an international hide grading standard, an industry-wide hide grading standard, or a proprietary hide grading standard. For example, a proprietary hide grading standard can assign an "AA" grade to tanned hides that include a single butt brand, light healed scratches through the prime, isolated light open scratches at the margins, and are suitable for full grain aniline or semi-aniline leather applications; an "AS" grade to tanned hides that include two butt brands or butt and center brands, light healed scratches through the prime, isolated light open scratches at the margins, and are suitable for full grain aniline or semi-aniline leather applications; a "B" grade to tanned hides that include up to two brands, including both butt and rib brands, with medium healed scratches and open scratches through the prime, and are suitable for pigmented or lightly tanned leather applications; and a "C" grade to tanned hides that include multiple brands, minimal open scratches, multiple healed scratches throughout the hides, and are suitable for corrected grain leather applications.

As an alternative example, a proprietary hide grading standard can assign an "A" grade to tanned hides that are free from parasite damage, contain butt brands, have light open and healed scratches throughout the prime, and are suitable for full grain aniline or semi-aniline leather applications; a "B" grade to tanned hides that have healed parasite damage at the margins, butt brands, medium healed and open scratches in the prime, and are suitable for pigmented or lightly tanned leather applications; a "C" grade to tanned hides that have heavy parasite damage, multiple brands, open scratches through the prime, and are suitable for corrected grain leather; and a "Reject" grade to tanned hides that are misshapen, damaged, or have gross processing defects, but nevertheless are suitable for heavily embossed leathers.

In one or more embodiments, grading and packing system 106 sorts, folds, and packs each tanned hide in response to a grade being assigned to each hide. For example, grading and packing system 106 can include a plurality of hide stacking sites, such that tanned hides of the same grade can be sorted, folded, and packed at the same hide stacking site. Additionally, in one or more embodiments, grading and packing system 106 can perform rewetting and/or splitting of the tanned hides prior to sorting, folding, and stacking each tanned hide at a particular hide stacking site.

Moreover, in one or more embodiments, the grading and packing system 106 can tag or otherwise label tanned hides with a unique hide identifier that can be stored by one or more computing devices of tanning facility 102 for purposes of improved traceability and quality assurance. Furthermore, the grading and packing system 106 can associate the unique hide identifier for each tanned hide with the assigned grade for each tanned hide, as well as other tannery process information that the tanning facility 102 can generate and store using one or more computing devices. In one or more embodiments, the tanning facility 102 can assign a unique hide identifier before a grade is assigned to a particular hide, or alternatively, the grading and packing system 106 can assign a grade to a hide before a unique hide identifier is assigned to a particular hide. Thus, the association of a unique hide identifier to a grade of a hide can occur once the grading and packaging system 106 determines both items of information.

As further illustrated by FIG. 1, tanning facility 102 can include a customized processing system 108. In one or more embodiments, customized processing system 108 receives tanned hides that the grading and packing system 106 has previously graded. For example, customized processing system 108 can receive tanned hides that are automatically transported (e.g., via a conveyor system) from grading and packing system 106, or alternatively, customized processing system 108 can received tanned hides that are manually transported (e.g., via rolling carts) from grading and packing system 106.

Moreover, in one or more embodiments, customized processing system 108 performs further processing on graded tanned hides. As an example, customized processing system 108 can rewet and/or wring (i.e., sammy) graded tanned hides to a moisture level according to customer requirements. As a further example, customized processing system 108 can trim and/or shave the graded tanned hides to a particular size, split the hides to a specified thickness, and/or fold the hides in a certain manner. Thus, customized processing system 108 can perform one or more processes, including for example, trimming, shaving, splitting, and folding, and the one or more processes can be tailored according to customer specifications. Furthermore, in one or more embodiments, customized processing system 108 can pack the graded tanned hides for shipment or storage purposes.

FIG. 1 further illustrates that system 100 can include a leather finishing system 112. In one or more embodiments, leather finishing system 112 receives graded tanned hides from tanning facility 102 and transforms those hides into finished leather using a variety of processes. For example, leather finishing system 112 can perform any number of leather finishing processes, including retanning, coloring, fatliquoring, setting out, drying, conditioning, staking, dry milling, buffing, finishing, and/or plating. Once leather finishing system 112 converts the graded tanned hides into finished leather, leather product manufacturers can use the finished leather to make leather products for end consumers.

Figure 2:
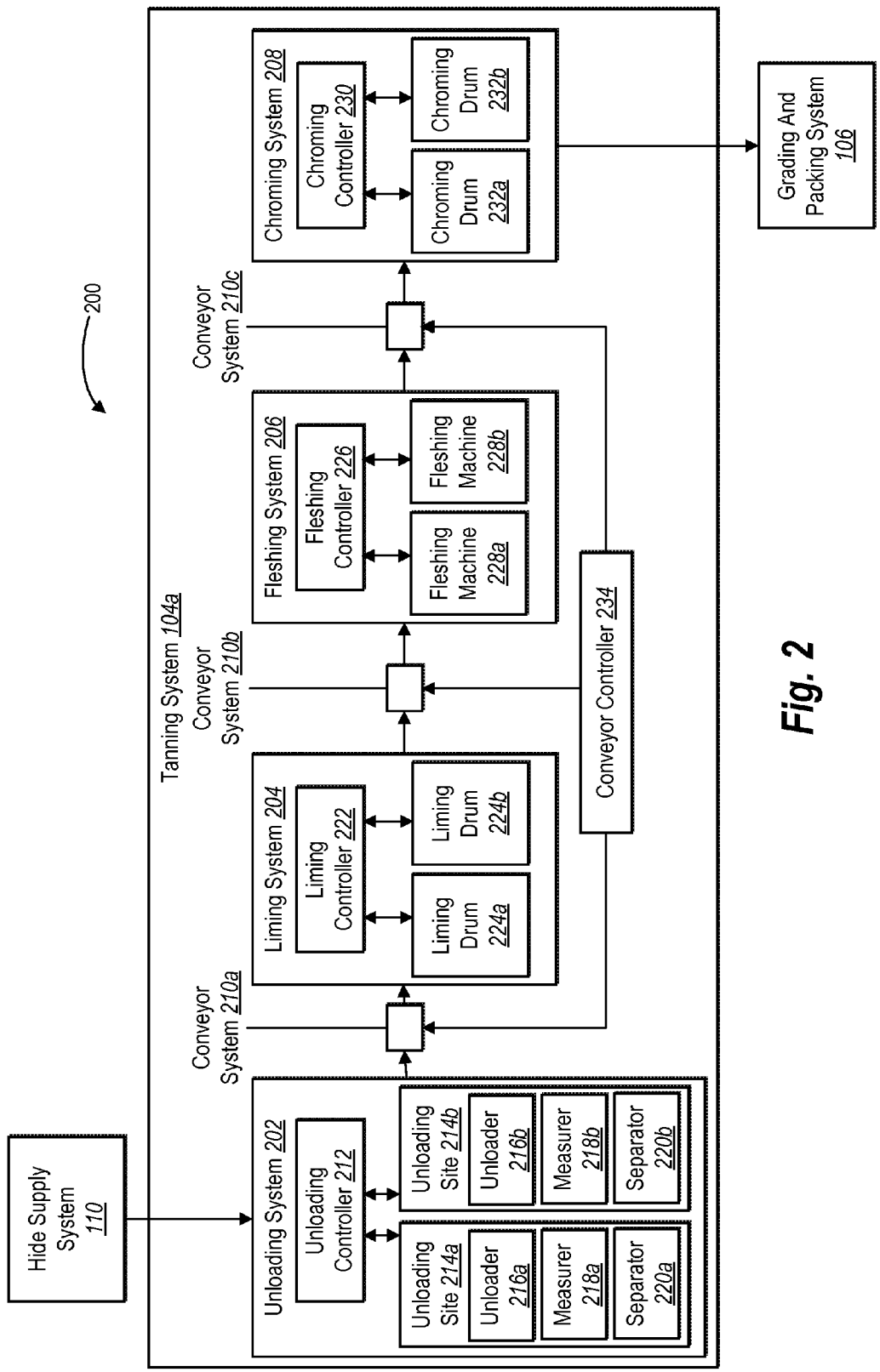
FIG. 2 illustrates a detailed schematic diagram of a tanning system of FIG. 1 in accordance with one or more embodiments.

FIG. 2 illustrates a detailed schematic diagram of a tannery system 200 that illustrates one example embodiment of system 100 and includes a tanning system 104a of FIG. 1 in accordance with one or more embodiments. As shown by FIG. 2, the tanning system 104a includes an unloading system 202, a liming system 204, a fleshing system 206, a chroming system 208, and multiple conveyor systems 210a-210c.

FIG. 2 further illustrates that unloading system 202 receives raw animal hides from hide supply system 110. After receiving the raw animal hides from hide supply system 110, unloading system 202 unloads, measures, and separates the raw animal hides into one or more hide batches. Unloading system 202 then provides the one or more hide batches to conveyor system 210a, which transports the one or more hide batches to liming system 204. Liming system 204 receives the one or more hide batches from unloading system 202 via conveyor system 210a and then liming system 204 performs a liming process on the one or more hide batches according to one or more liming recipes. Liming system 204 then provides the one or more hide batches to conveyor system 210b, which transports the one or more hide batches to fleshing system 206.

Fleshing system 206 receives the one or more hide batches from liming system 204 via conveyor system 210b. Fleshing system 206 performs a fleshing process on the one or more hide batches, which removes excess flesh, hair, and other material from the hides. Following the fleshing process, fleshing system 206 provides the one or more hide batches to conveyor system 210c, which transports the one or more hide batches to chroming system 208. Chroming system 208 receives the one or more hide batches from fleshing system 206 via conveyor system 210c and then chroming system 208 performs a chroming process on the one or more hide batches according to one or more chroming recipes. Chroming system 208 then provides the one or more hide batches to grading and packing system 106, for example, by using another conveyor system.

As shown in FIG. 2, tanning system 104a includes unloading system 202. In particular, unloading system 202 includes an unloading controller 212 that communicates with, monitors, and controls one or more unloading sites 214a-214b. The one or more unloading sites 214a-214b may have a location proximate a tanning facility loading dock or other tanning facility entrance where raw animal hides can be received from a hide supply system 110. Moreover, the one or more unloading sites 214a-214b include respective unloaders 216a-216b, measurers 218a-218b, and separators 220a-220b. For example, unloaders 216a-216b may each include a hydraulic lift that lifts, tips, and dumps raw animal hides from transport containers onto respective measurers 218a-218b. As a further example, measurers 218a-218b may each include a weight scale that determines the weight of the raw animal hides dumped from the transport containers by unloaders 216a-216b. As another example, separators 220a-220b may each include a mechanism (e.g., a knockdown wheel) that separates each individual raw animal hide from the lot of raw animal hides dumped from the transport containers by unloaders 216a-216b.

In one or more embodiments, the unloading controller 212 includes a computing device, such as a programmable logic controller ("PLC"), that is communicatively coupled to unloaders 216a-216b, measurers 218a-218b, and separators 220a-220b in order to supervise and manage unloading sites 214a-214b. For example, unloading controller 212 may detect when a transport container of raw animal hides is loaded into unloader 216a and, in response, unloading controller 212 may command unloader 216a to provide the raw animal hides to either measurer 218a or separator 220a (e.g., by lifting, tipping, and emptying the raw animal hides from the transport container). As another example, unloading controller 212 may detect when one or more raw animal hides are loaded onto measurer 218a and, in response, unloading controller 212 may receive an indication of the weight of the one or more raw animal hides as measured by the weight scale of measurer 218a. As yet another example, unloading controller 212 may detect when one or more raw animal hides are loaded into separator 220a and, in response, unloading controller 212 may command separator 220a to begin separating the one or more raw animal hides into individual hides.

Furthermore, in one or more embodiments, unloading controller 212 receives, determines, and stores metrics and other data associated with the unloading of raw animal hides performed by unloaders 216a-216b (e.g., number of transport containers unloaded), the measuring of raw animal hides performed by measurers 218a-218b (e.g., weight of raw animal hides), and the separating of raw animal hides performed by separators 220a-220b (e.g., number of individual raw animal hides). Tracking such metrics and other data facilitates improved coordination, efficiency, and traceability within tanning system 104a as compared to conventional tanning systems.

As also shown in FIG. 2, tanning system 104a includes liming system 204. In particular, liming system 204 includes a liming controller 222 that communicates with, monitors, and controls one or more liming drums 224a-224b. Although FIG. 2 illustrates that liming system 204 includes two liming drums 224a-224b, it should be understood that liming system 204 can include any number of liming drums. More specifically, in one or more embodiments, the liming controller 222 includes a computing device, such as a PLC, that is communicatively coupled to liming drums 224*a*-224*b* in order to supervise and manage liming drums 224*a*-224*b*. Examples of liming drums 224*a*-224*b* may include but are not limited to drums made by Gozzini 1906 Turini Group S.R.L., Hüni A.G., Pajusco Tecnologie S.P.A., Poletto S.T.A. S.R.L., and Vallero International S.P.A.

Accordingly, in one or more embodiments, liming controller 222 manages the liming process performed on raw animal hides loaded into liming drums 224*a*-224*b*. For example, liming controller 222 monitors the status of each of liming drums 224*a*-224*b* (e.g., whether each liming drum 224*a*-224*b* is empty and ready to be loaded with raw animal hides, fully loaded with animal hides, in the process of loading animal hides, or in the process of performing the liming process). In particular, liming controller 222 may receive from sensors of liming drums 224*a*-224*b* an indication of the weight of animal hides loaded into liming drums 224*a*-224*b* in order to determine a status for each liming drum 224*a*-224*b*.

As a further example, liming controller 222 controls and monitors the liming recipe applied to the animal hides loaded into liming drums 224*a*-224*b*. More specifically, liming controller 222 controls the addition of liming process chemicals to liming drums 224*a*-224*b*, the rotation of the liming drums 224*a*-224*b*, and the removal or emptying of liming process chemicals and byproducts from liming drums 224*a*-224*b*. Further, liming controller 222 controls providing the animal hides to conveyor system 210*b* for transport to fleshing system 206.

FIG. 2 also illustrates that tanning system 104*a* includes fleshing system 206. In particular, fleshing system 206 includes a fleshing controller 226 that communicates with, monitors, and controls one or more fleshing machines 228*a*-228*b*. More specifically, in one or more embodiments, the fleshing controller 226 includes a computing device, such as a PLC, that is communicatively coupled to fleshing machines 228*a*-228*b* in order to supervise and manage fleshing machines 228*a*-228*b*. Examples of fleshing machines 228*a*-228*b* may include but are not limited to machines made by Aletti Giovanni & Figli S.R.L., Costruzioni Meccaniche Persico S.R.L., Mosconi S.P.A., New 3P S.R.L., Rizzi S.P.A., and Turner S.A.S.

Thus, in one or more embodiments, fleshing controller 226 manages the fleshing process performed on animal hides loaded into fleshing machines 228*a*-228*b*. For example, fleshing controller 226 monitors the status of each fleshing machine 228*a*-228*b* (e.g., whether each fleshing machine 228*a*-228*b* is empty and ready to deflesh hides or busy in the process of defleshing animal hides). More specifically, fleshing controller 226 may receive input from each fleshing machine 228*a*-228*b* that indicates the respective operational status of each fleshing machine 228*a*-228*b*. Moreover, fleshing controller 226 monitors the rate at which animal hides are loaded into fleshing machines 228*a*-228*b*. For example, fleshing controller 226 may monitor and control a conveyor system (e.g., a hook conveyor system) to regulate the pace of loading animal hides into fleshing machines 228*a*-228*b* from conveyor system 210*b*. Additionally, fleshing controller 226 may control providing the animal hides to conveyor system 210*c* for transport to chroming system 208.

Moreover, FIG. 2 shows that tanning system 104*a* includes chroming system 208. In particular, chroming system 208 includes a chroming controller 230 that communicates with, monitors, and controls one or more chroming drums 232*a*-232*b*. Although FIG. 2 illustrates that chroming system 208 includes two chroming drums 232*a*-232*b*, it should be understood that chroming system 208 can include any number of chroming drums. More specifically, in one or more embodiments, the chroming controller 230 includes a computing device, such as a PLC, that is communicatively coupled to chroming drums 232*a*-232*b* in order to supervise and manage chroming drums 232*a*-232*b*. Examples of chroming drums 232*a*-232*b* may include but are not limited to drums made by Gozzini 1906 Turini Group S.R.L., Hüni A.G., Pajusco Tecnologie S.P.A., Poletto S.T.A. S.R.L., and Vallero International S.P.A.

Furthermore, in one or more embodiments, chroming controller 230 manages the chroming process performed on animal hides loaded into chroming drums 232*a*-232*b*. For example, chroming controller 230 monitors the status of each of chroming drums 232*a*-232*b* (e.g., whether each chroming drum 232*a*-232*b* is empty and ready to be loaded with hides, fully loaded with hides, in the process of loading hides, or in the process of performing the chroming process). In particular, chroming controller 230 may receive from sensors of chroming drums 232*a*-232*b* an indication of the weight of hides loaded into chroming drums 232*a*-232*b* in order to determine a status for each chroming drum 232*a*-232*b*.

As a further example, chroming controller 230 controls and monitors the chroming recipe applied to the hides loaded into chroming drums 232*a*-232*b*. More specifically, chroming controller 230 controls the addition of chroming process chemicals to chroming drums 232*a*-232*b*, the rotation of the chroming drums 232*a*-232*b*, and the removal or emptying of chroming process chemicals and byproducts from chroming drums 232*a*-232*b*. Additionally, chroming controller 230 may control providing the hides to grading and packing system 106 from chroming drums 232*a*-232*b*.

Also, as illustrated by FIG. 2, one or more embodiments of tanning system 104*a* include one or more conveyor systems 210*a*-210*c* that are in communication with, monitored, and controlled by conveyor controller 234. However, as one will appreciate from the disclosure herein, each conveyor system 210*a*-210*c* may be in communication with, monitored, and controlled by the same conveyor controller (e.g., conveyor controller 234) or by separate conveyor controllers dedicated to each conveyor system 210*a*-210*c*. Moreover, in one or more embodiments, the conveyor controller 234 includes a computing device, such as a PLC, that is communicatively coupled to conveyor systems 210*a*-210*c* in order to supervise and manage conveyor systems 210*a*-210*c*. Examples of conveyor systems 210*a*-210*c* may include but are not limited to conveyor systems made by Feltre S.R.L. and Thema System S.R.L.

Thus, as one will appreciate from the disclosure herein and the foregoing description of FIG. 2, one or more embodiments of tanning system 104*a* reduce the amount of manual handling of animal hides (e.g., through the use of conveyor systems 210*a*-210*c* managed by conveyor controller 234). Furthermore, one or more embodiments of tanning system 104*a* improve coordination of tannery processes (e.g., by monitoring and managing the operational status of liming drums 224*a*-224*b*, fleshing machines 228*a*-228*b*, and chroming drums 232*a*-232*b* to coordinate the loading and unloading of animal hides throughout the various tanning processes). Accordingly, one or more embodiments of tanning system 104*a* ultimately improve the efficiency of tanning animal hides into leather.

Figure 3:
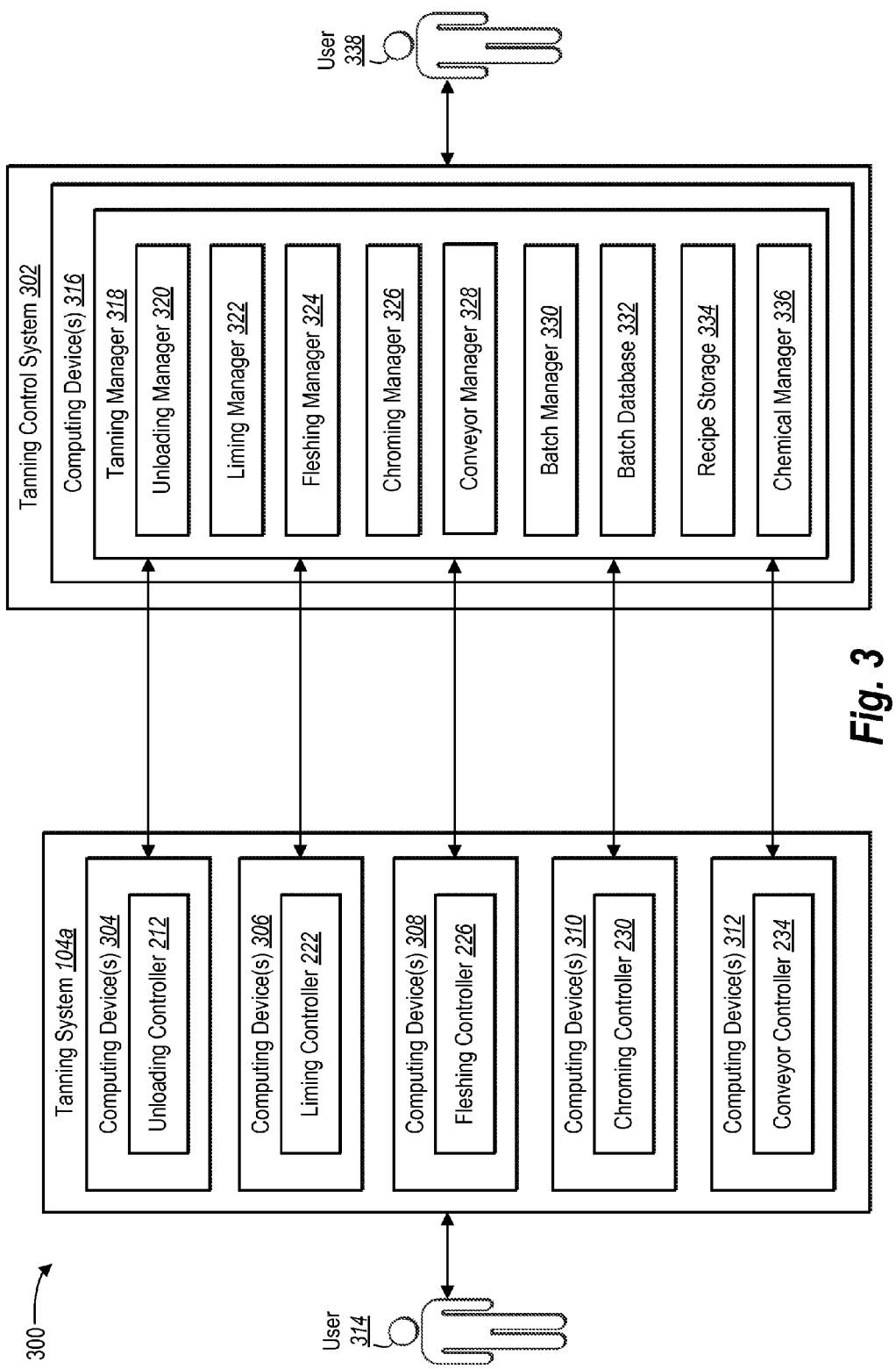
FIG. 3 illustrates a detailed schematic diagram of a tanning system of FIG. 1 and a tanning control system in accordance with one or more embodiments.

FIG. 3 illustrates a detailed schematic diagram of a tanning system of FIG. 1 and a tanning control system in accordance with one or more embodiments. Tannery system 300 illustrates one example embodiment of system 100, as well as various aspects of one embodiment of tanning system 104a as shown and described with respect to FIG. 2. More specifically, as shown by FIG. 3, tannery system 300 includes tanning system 104a, which includes computing device(s) 304-312 (e.g., PLCs), each of which respectively further include unloading controller 212, liming controller 222, fleshing controller 226, chroming controller 230, and conveyor controller 234. Further, as shown by FIG. 3, tannery system 300 includes tanning control system 302, which includes computing device(s) 316, which further includes a tanning manager 318. In one or more embodiments, tanning manager 318 includes unloading manager 320, liming manager 322, fleshing manager 324, chroming manager 326, conveyor manager 328, batch manager 330, batch database 332, recipe storage 334, and chemical manager 336.

As one will appreciate, in one or more embodiments of tanning system 104a, each of unloading controller 212, liming controller 222, fleshing controller 226, chroming controller 230, and conveyor controller 234 may operate on one or more separate computing devices, as illustrated by FIG. 3. However, in one or more alternative embodiments one or more of unloading controller 212, liming controller 222, fleshing controller 226, chroming controller 230, and conveyor controller 234 may be combined together to operate on the same computing device. For example, in one embodiment unloading controller 212, liming controller 222, fleshing controller 226, chroming controller 230, and conveyor controller 234 may all operate on a single computing device (e.g., a single PLC).

As another example, in one embodiment unloading controller 212 and conveyor controller 234 may operate on a first computing device (e.g., a first PLC), liming controller 222 and chroming controller 230 may operate on second computing device (e.g., a second PLC), and fleshing controller 226 may operate on a third computing device (e.g., a third PLC). Accordingly, in this example, controllers of tanning system 104a that share similar functionality may be combined to operate on common computing devices, as may be desirable.

As FIG. 3 illustrates, in one or more embodiments each of unloading controller 212, liming controller 222, fleshing controller 226, chroming controller 230, and conveyor controller 234 of tanning system 104a may be communicatively coupled (e.g., via a wired or wireless computer network) to tanning manager 318 of tanning control system 302. In general, unloading controller 212, liming controller 222, fleshing controller 226, chroming controller 230, and conveyor controller 234 of tanning system 104a may generate and provide information to tanning manager 318. Additionally, tanning manager 318 (or the respective components of tanning manager 318) may monitor and control each of unloading controller 212, liming controller 222, fleshing controller 226, chroming controller 230, and conveyor controller 234 of tanning system 104a.

For example, in one or more embodiments unloading controller 212 operating on computing device(s) 304 may generate and obtain unloading process information from various sensors and other data sources associated with unloading sites 214a-214b and then communicate the unloading process information to unloading manager 320. More specifically, unloading controller 212 may, for example, receive and/or provide unloading process information concerning hides being unloaded, such as hide type, weight, and number of hides, as well as associated transport container identifiers, transport vehicle identifiers, and slaughterhouse plant identifiers. At least a portion of this unloading process information may then be saved as tannery process information as more fully described below in reference to FIG. 4. Additionally, in one or more embodiments unloading manager 320 may communicate with unloading controller 212 to direct control of unloading sites 214a-214b.

In addition to the unloading process information, in one or more embodiments liming controller 222 operating on computing device(s) 306 may generate and/or obtain liming process information from various sensors and other data sources associated with liming drums 224a-224b and then communicate the liming process information to liming manager 322. In particular, liming controller 222 may, for example, control and monitor the liming recipe applied to the animal hides loaded into liming drums 224a-224b and then communicate liming process information to the liming manager 322. Furthermore, in one or more embodiments liming manager 322 may communicate with liming controller to direct control of liming drums 224a-224b.

Notwithstanding the liming process information, in one or more embodiments fleshing controller 226 operating on computing device(s) 308 may generate and/or obtain fleshing process information from various sensors and other data sources associated with fleshing machines 228a-228b and then communicate this information to fleshing manager 324. Specifically, fleshing controller 226 may, for example, control and monitor the fleshing process performed on the animal hides loaded into fleshing machines 228a-228b and then communicate fleshing process information to the fleshing manager 324. The fleshing process information may include information concerning the pace at which hides are being defleshed or otherwise processed through fleshing machines 228a-228b. Moreover, in one or more embodiments fleshing manager 324 may communicate with fleshing controller 226 to direct control of fleshing machines 228a-228b.

Additionally, in one or more embodiments chroming controller 230 operating on computing device(s) 310 may generate and obtain chroming process information from various sensors and other data sources associated with chroming drums 232a-232b and then communicate this information to chroming manager 326. In particular, chroming controller 230 may, for example, control and monitor the chroming recipe applied to the animal hides loaded into chroming drums 232a-232b and then communicate chroming process information to the chroming manager 326. Additionally, in one or more embodiments chroming manager 326 may communicate with chroming controller 230 to manage control of chroming drums 232a-232b.

As an additional example, in one or more embodiments conveyor controller 234 operating on computing device(s) 312 may generate and obtain conveyor process information from various sensors and other data sources associated with conveyor systems 210a-210c and then communicate conveyor process information to conveyor manager 328. More specifically, conveyor controller 234 may, for example control and monitor the transport of animal hides from unloading sites 214a-214b to liming drums 224a-224b to fleshing machines 228a-228b and on to chroming drums 232a-232b. Moreover, in one or more embodiments conveyor manager 328 may communicate with conveyor controller 234 to direct control of conveyor systems 210a-210c.

As FIG. 3 illustrates, tanning manager 318 includes unloading manager 320, liming manager 322, fleshing manager 324, chroming manager 326, conveyor manager 328, batch manager 330, batch database 332, recipe storage 334, and chemical manager 336. As one will appreciate, in one or more embodiments the various components of tanning manager 318 may interoperate, communicate, cooperate, and otherwise share information and other data. Furthermore, each component of tanning manager 318 may leverage and otherwise utilize the functionality provided by other components of tanning manager 318. Additionally, as one will appreciate, tanning manager 318 may include other additional components, or alternatively, tanning manager 318 may comprise fewer components than those shown in FIG. 3. Moreover, the components of tanning manager 318 may be combined together or separated, as may be desirable.

FIG. 3 shows that tanning manager 318 includes unloading manager 320. In one or more embodiments, unloading manager 320 controls and monitors unloading system 202 of FIG. 2 by communicating with unloading controller 212. Alternatively, in one or more other embodiments unloading manager 320 may control and monitor unloading system 202 of FIG. 2 by communicating directly with unloading sites 214a-214b and the respective unloaders 216a-216b, measurers 218a-218b, and separators 220a-220b.

For example, unloading manager 320 may determine that a transport container of raw animal hides is loaded into unloading site 214a at unloader 216a and, in response, unloading manager 320 may direct unloader 216 to unload the raw animal hides from the transport container. Further, unloading manager 320 may then determine measurements of the raw animal hides taken by measurer 218a and determine a count of the raw animal hides taken by separator 220a. Additionally, unloading manager 320 may receive hide supplier information associated with the unloaded raw animal hides. Further, in one or more embodiments, unloading manager 320 may interoperate with batch manager 330 to generate and store tannery process information associated with the unloaded raw animal hides to the batch database 332.

FIG. 3 also shows that tanning manager 318 includes liming manager 322. In one or more embodiments, liming manager 322 controls and monitors liming system 204 of FIG. 2 by communicating with liming controller 222. In one or more alternative embodiments liming manager 322 may control and monitor liming system 204 of FIG. 2 by communicating directly with liming drums 224a-224b. For example, liming manager 322 may determine the status of each of liming drums 224a-224b. Moreover, liming manager 322 may control and monitor the liming recipe applied to the animal hides loaded into liming drums 224a-224b. Thus, in one or more embodiments, liming manager 322 may interoperate with batch manager 330, batch database 332, recipe storage 334 and chemical manager 336 to manage the performance of the liming recipe applied to the animal hides.

In addition, FIG. 3 shows that tanning manager 318 includes fleshing manager 324. In one or more embodiments, fleshing manager 324 controls and monitors fleshing system 206 of FIG. 2 by communicating with fleshing controller 226. Alternatively, in one or more other embodiments fleshing manager 324 may control and monitor fleshing system 206 of FIG. 2 by communicating directly with fleshing machines 228a-228b. As an example, fleshing manager 324 may determine the status of each of fleshing machines 228a-228b. Additionally, fleshing manager 324 may control and monitor the rate at which animal hides are loaded and processed by fleshing machines 228a-228b.

Furthermore, FIG. 3 shows that tanning manager 318 includes chroming manager 326. In one or more embodiments, chroming manager 326 controls and monitors chroming system 208 of FIG. 2 by communicating with chroming controller 230. In one or more alternative embodiments chroming manager 326 may control and monitor chroming system 208 of FIG. 2 by communicating directly with chroming drums 232a-232b. For example, chroming manager 326 may determine the status of each of chroming drums 232a-232b. Moreover, chroming manager 326 may control and monitor the chroming recipe applied to the animal hides loaded into chroming drums 232a-232b. Accordingly, in one or more embodiments, chroming manager 326 may interoperate with batch manager 330, batch database 332, recipe storage 334 and chemical manager 336 to manage the performance of the chroming recipe applied to the animal hides.

Moreover, FIG. 3 shows that tanning manager 318 includes conveyor manager 328. In one or more embodiments, conveyor manager 328 controls and monitors conveyor systems 210a-210c of FIG. 2 by communicating with conveyor controller 234. Alternatively, in one or more other embodiments conveyor manager 328 may control and monitor conveyor systems 210a-210c of FIG. 2 by communicating directly with conveyor systems 210a-210c. As an example, conveyor manager 328 may determine the status of each of conveyor systems 210a-210c which may include but not be limited to the type and number of hides routed to a particular liming drum, fleshing machine, or chroming drum.

Further, FIG. 3 illustrates that tanning manager 318 includes a batch manager 330. In one or more embodiments, batch manager 330 receives unloading process information associated with animal hides unloaded from transport containers by unloading system 202 and then batch manager 330 generates a unique batch identifier for a batch of animal hides. For example, in one or more embodiments, batch manager 330 may generate a unique batch identifier based on one or more factors, such as a batch weight, a batch hide count, a batch hide type, a range of container identifiers, a transport vehicle identifier, or a plant identifier. Moreover, in one or more embodiments, batch manager 330 may generate a batch identifier based upon recipe information (e.g., liming recipes and/or chroming recipes) stored in recipe storage 334. Thus, as one will appreciate, recipe information stored in recipe storage 334 may include batch specifications (e.g., max batch weight per hide type and/or max batch hide count per hide type) used by batch manager 330 to generate batches for processing.

Furthermore, in one or more embodiments, batch manager 330 assigns a batch of animal hides with a unique batch identifier to one or more particular liming drums and chroming drums. In one or more embodiments, batch manager 330 assigns a batch to a particular liming drum and a particular chroming drum at different times. For example, as animal hides for a batch are unloaded by unloading system 202, batch manager 330 assigns the batch to a particular liming drum, and subsequently, batch manager 330 assigns the batch to a particular chroming drum prior to or following completion of the liming process performed on that batch. In one or more alternative embodiments, batch manager 330 assigns a batch to a particular liming drum and a particular chroming drum at the same time (e.g., as the animal hides for that batch are unloaded).

In addition, in one or more embodiments, batch manager 330 may store batch information and other tannery process information to a batch database 332. More specifically, in one or more embodiments, once batch manager 330 generates and assigns a batch identifier, the batch identifier, total batch weight, batch hide count, batch hide type, transport container identifiers, transport vehicle identifiers, and plant identifiers may be stored in batch database 332. Furthermore, in one or more embodiments, once batch manager 330 assigns a liming drum or chroming drum to a batch, then batch manager 330 may store the respective liming drum identifier or chroming drum identifier to batch database 332.

FIG. 3 further illustrates that tanning manager 318 includes recipe storage 334. In one or more embodiments, recipe information (e.g., liming recipes and/or chroming recipes) stored in recipe storage 334 may be used to control and manage liming system 204 and/or chroming system 208. For example, in one or more embodiments liming manager 322 may identify and select a liming recipe from recipe storage 334 and then liming manager 322 may reference the liming recipe to control the liming process performed on a batch of animal hides loaded into a particular liming drum. As another example, in one or more embodiments chroming manager 326 may identify and select a chroming recipe from recipe storage 334 and then chroming manager 326 may reference the liming recipe to control the chroming process performed on a batch of animal hides loaded into a particular chroming drum.

As yet another example, in one or more embodiments batch manager 330 may determine a batch of animal hides with reference to recipe information stored in recipe storage 334. Accordingly, in one or more embodiments recipe storage 334 may provide a plurality of liming and/or chroming recipes that can more specifically tailor the liming and chroming processes to particular characteristics of hides in a batch (e.g., tailoring the liming and chroming processes based on one or more of batch weight, batch hide count, and batch hide type).

In addition, in one or more embodiments, one or more components of tanning manager 318 may cooperate to dynamically generate a liming recipe and/or a chroming recipe based on one or more hide characteristics common to a batch of hides routed to a particular drum (i.e., one or more batch hide characteristics). For example, in one or more embodiments, tanning manager 318 may determine a batch weight after unloading a batch of hides from transport containers and then generate a liming recipe based on that weight. As another example, in one or more embodiments, tanning manager 318 may determine a batch weight after unloading a batch of hides from a liming drum (e.g., by relying on weight scales located at the unloading site of the liming drum) and then generate a chroming recipe based on that weight.

Further, in one or more embodiments, one or more components of tanning manager 318 may cooperate to dynamically modify a liming recipe and/or a chroming recipe, while performing the liming and/or chroming processes, and based on factors not related to the animal hides. For example, tanning manager 318 may modify the liming and/or chroming recipes based on one or more recipe factors, such as water temperature or pH. Additionally, tanning manager 318 can modify the liming and/or chroming recipes based on measured chemical concentration, air humidity levels, or any other measurable factor that can affect the outcome of the liming or chroming processes. Various measurement devices can be communicably coupled to the tanning manager 318 to allow the tanning manager 318 to receive data and dynamically adjust the liming and/or chroming recipes.

For example, and as illustrated in FIG. 3, tanning manager 318 includes chemical manager 336. In one or more embodiments, chemical manager 336 communicates with sensors and other data sources associated with chemical storage in a tanning facility (e.g., sensors that provide status information concerning the amount of liming and chroming chemicals stored on site). In addition, in one or more embodiments chemical manager 336 controls and monitors the addition of chemicals to liming drums 224a-224b and chroming drums 232a-232b in accordance with liming and chroming recipes (e.g., either through direct communication with those drums, via communication with liming controller 222 and chroming controller 230, or via communication with liming manager 322 and chroming manager 326).

Furthermore, FIG. 3 shows that a user 314 may interact with tanning system 104a. In one or more embodiments, user 314 may interact with user interfaces of computing devices 304-312 operating unloading controller 212, liming controller 222, fleshing controller 226, chroming controller 230, and conveyor controller 234 respectively. In particular, user 314 may interact with and provide user input to a user interface associated with one of computing devices 304-312 (e.g., a touch screen or keypad of a PLC). For example, in one or more embodiments user 314 may interact with a user interface of computing device 304 operating unloading controller 212 by providing hide supplier information associated with hides to be unloaded.

As another example, in one or more embodiments user 314 may interact with user interfaces of computing devices 306 and 310 operating liming controller 222 and chroming controller 230 to manually modify the respective liming and chroming recipes followed by those controllers (e.g., manually adding or reducing the amount of chemicals added to drums). As one will appreciate, in one or more embodiments user 314 may also interact with other user interfaces associated with other controllers included in tanning system 104a.

Moreover, FIG. 3 shows that a user 338 may interact with tanning control system 302. In one or more embodiments, user 338 may interact with a user interface of computing device 316 operating tanning manager 318 and it respective components. For example, user 338 may interact with a user interface of batch manager 332 to generate a batch of hides and assign a unique batch identifier to the batch of hides. As another example, user 338 may interact with a user interface associated with liming manager 322 to select and apply a liming recipe to a batch of hides. As yet another example, user 338 may interact with a user interface associated with chroming manager 326 to select and apply a chroming recipe to a batch of hides. As one will appreciate, in one or more embodiments user 338 may also interact with other user interfaces associated with other components of tanning manager 318.

FIG. 4 illustrates exemplary portions of a tanning system database in accordance with one or more embodiments. In particular, a portion 400 of tanning system database shows four batches of animal hides 402 (i.e., batch identifiers 100011, 100012, 100013, and 100014) and the respective batch weight 404, batch hide count 406, batch hide type 408, liming drum identifier 410, chroming drum identifier 412, transport container identifiers 414, transport vehicle identifier 416, and plant identifier 418 that correspond to each of the four batches. As one will appreciate, the tanning system database shown by portion 400 of FIG. 4 illustrates one embodiment of batch database 332 of FIG. 3. Thus, in one or more embodiments, tanning system database and batch database 332 may be the same database and tanning manager 318 (or any of its respective components) may store data and other information to batch database 332 (i.e., tanning system database).

As FIG. 4 shows, in one or more embodiments tanning system database may store container identifiers 414, a transport vehicle identifier 416, and a plant identifier 418 associated with a particular batch (e.g., container identifiers 1-12, transport vehicle identifier 1NKWGGGG80J066189, and plant identifier Liberal associated with batch identifier 100011). Furthermore, in one or more embodiments the associated container identifiers, transport vehicle identifier, and plant identifier for a batch may be determined when transport containers with those container identifiers are unloaded by an unloading system (e.g., unloading controller 212 may provide tanning manager 318 with this information to be stored in batch database 332). Moreover, in one or more embodiments tanning manager 318 may keep track of container identifiers, a transport vehicle identifier, and a plant identifier while forming a batch.

FIG. 4 further illustrates that in one or more embodiments tanning system database may store batch weight 404, batch hide count 406, and batch hide type 408. More specifically, in one or more embodiments tanning manager 318 may track batch weight 404, batch hide count 406, and batch hide type 408 while unloading hides and forming a batch. Accordingly, in one or more embodiments batch weight 404 and batch hide count 406 may change and increase until tanning manager 318 determines that at least one of a batch weight threshold or a batch hide count threshold is met.

FIG. 4 also shows that in one or more embodiments tanning system database may store a batch identifier 402. In particular, in one or more embodiments once tanning manager 318 determines that at least one of a batch weight threshold or a batch hide count threshold is met, then tanning manager 318 may generate a unique batch identifier and associate that identifier with the batch that has met the threshold (e.g., batch identifier 100011 associated with the first batch shown in FIG. 4).

Further, as FIG. 4 illustrates, one or more embodiments of tanning system database may store liming drum identifier 410 and chroming drum identifier 412. More specifically, in one or more embodiments once tanning manager 318 has created a batch of hides, then tanning manager 318 may assign and store a liming drum identifier and a chroming drum identifier that are associated with that batch (e.g., liming drum identifier 6 and chroming drum identifier 14 assigned to batch identifier 100011). As one will appreciate, in one or more embodiments, tanning manager 318 may assign and store the liming drum identifier and the chroming drum identifier at the same time (e.g., when forming the batch after completion of unloading all container identifiers that make up that batch).

Alternatively, in one or more other embodiments, tanning manager 318 may assign and store the liming drum identifier and the chroming drum identifier at different times (e.g., assigning the liming drum identifier after unloading all transport containers that make up that batch and assigning the chroming drum identifier shortly before or after completing the liming process on the batch). Moreover, in one or more embodiments, once the liming drum identifier and/or the chroming drum identifier are assigned to a batch, then tanning manager 318 may coordinate the transport of the hides in that batch to the appropriate drum (e.g., conveyor manager 328 of tanning manager 318 may communicate with conveyor controller 234 to direct the transportation of the batch using conveyor systems 210a-210c).

As one will appreciate from the portion 400 of a tanning system database illustrated by FIG. 4, one or more embodiments provide improved traceability of animal hides throughout the tanning processes. This improved traceability makes it easier to troubleshoot problems that may arise with any tanning processes and allows a tannery to produce a more consistent tanned leather product.

Figure 5:
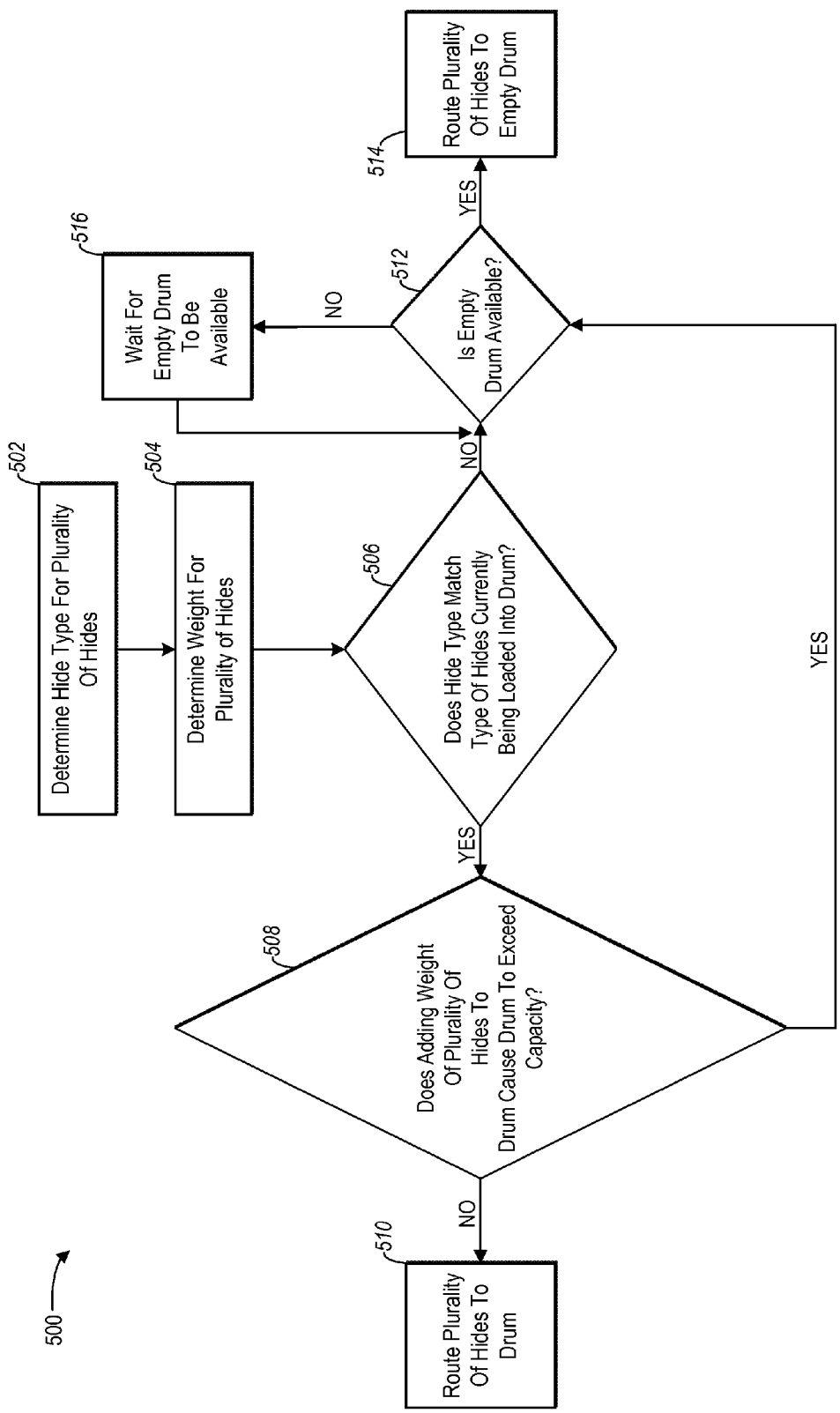
FIG. 5 illustrates a flowchart for routing a plurality of hides to one or more drums in accordance with one or more embodiments.

FIG. 5 illustrates a flowchart for routing a plurality of hides to one or more drums in accordance with one or more embodiments. In particular, the flowchart 500 of FIG. 5 shows how to assign and route a plurality of hides to one or more drums based on the hide type of the plurality of hides and the aggregate weight of the plurality of hides. In general, for example, there are three typical hide types—heifer, steer, and jumbo—each of which may have different characteristics. However, as one will appreciate, additional hide types may be used with one or more embodiments depending on the type of animal hide.

Further, and as shown in FIG. 5, a tanning control system (e.g., tanning control system 302 of FIG. 3) determines a hide type for a plurality of hides 502 transported in a particular transport container. For example, a user supervising an unloading system (e.g., unloading system 202 of FIG. 2) may input a hide type of a plurality of hides unloaded from a transport container and then unloading system may provide that hide type to tanning control system (e.g., via an unloading controller, such as unloading controller 212 of FIG. 2).

As another example, tanning control system may receive hide supplier information from a hide supply system that indicates the hide type for the plurality of hides contained in each transport container sent to the tanning facility (e.g., in response to scanning a barcode associated with the transport container). Accordingly, once a transport container is unloaded at the tanning facility, tanning control system may identify and correlate the transport container identifier with the associated hide type as indicated in the hide supplier information. As yet another example, tanning control system may determine the hide type of a plurality of hides from a transport container by using sensors or other detectors that inspect the plurality of hides once unloaded at an unloading.

As FIG. 5 also illustrates, in one or more embodiments, the tanning control system determines a weight for the plurality of hides 504. For example, tanning control system may determine the weight of the plurality of hides by receiving an indication of the weight from a measurer employed by an unloading system (e.g., measurer 218 at unloading site 214a of FIG. 2, which may be a weight scale). Alternatively, tanning control system may determine the weight of the plurality of hides by referring to a weight associated with the transport container and as provided in hide supplier information.

FIG. 5 further shows that in one or more embodiments the tanning control system determines whether the hide type of the plurality of hides matches a type of hides currently being loaded into a drum 506. For example, in one or more embodiments tanning control system (e.g., liming manager 322, chroming manager 326, and/or batch manager 330 of FIG. 3) may keep track of the hide type of hides currently loaded in one or more drums (i.e., liming drums or chroming drums). Accordingly, by tracking the hide type of hides currently loaded into drums, the tanning control system can assign and route hides of the same type to the same drum. As previously mentioned, grouping hides of the same type into the same drum is advantageous as it improves the consistency of tanned hides, thereby resulting in greater customer satisfaction.

Additionally, FIG. 5 illustrates that if the hide type of the plurality of hides matches the type of hides currently loaded into a particular drum 506, then, in one or more embodiments the tanning control system determines whether adding the weight of the plurality of hides to the particular drum will cause that drum to exceed its capacity 508. For example, in one or more embodiments tanning control system (e.g., liming manager 322, chroming manager 326, and/or batch manager 330 of FIG. 3) may keep track of the weight of all hides assigned and routed to a particular drum, as well as the total weight capacity of particular drums. Thus, by tracking the weight of all hides routed to particular drums and the total weight capacity of the drums, one or more embodiments can provide improved output through increased usage of available drum capacity.

Furthermore, as shown by FIG. 5, if adding the weight of the plurality of hides to a particular drum will not cause that drum to exceed its capacity 508, then, in one or more embodiments the tanning control system routes the plurality of hides to that particular drum 510. For example, in one or more embodiments the tanning control system may communicate with and direct a conveyor system (e.g., one of conveyor systems 210a-210c of FIG. 2) to transport the plurality of hides to the designated drum.

However, as FIG. 5 also illustrates, if the hide type of the plurality of hides does not match the type of hides currently loaded into a particular drum 506 or if adding the weight of the plurality of hides to the particular drum will cause that drum to exceed its capacity 508, then, the tanning control system determines whether an empty drum is available 512 for the plurality of hides. For example, the tanning control system may communicate with one or more weight sensors associated with the drums (e.g., scales or other load sensors) to determine which drums are empty. Further, the tanning control system may also check that no other hides have been assigned and routed to any of the drums determined to be empty.

As shown by FIG. 5, if an empty drum is available 512, then, in one or more embodiments the tanning control system routes the plurality of hides to one of the identified empty drums 514 (e.g., by communicating with and directing one or more conveyor systems). On the other hand, as FIG. 5 also shows, if an empty drum is not available 512, then, in one or more embodiments the tanning control system waits for an empty drum to be available 516. Once an empty drum becomes available, then the plurality of hides may be assigned and routed to that drum 514.

Moreover, in one or more embodiments as tanning control system waits for an empty drum to be available 516, tanning control system may route the plurality of hides to a staging area to facilitate continued unloading of transport containers by the unloading system (i.e., to avoid occupying an unloading site with a plurality of hides that are waiting for an available drum). Further, in one or more embodiments the tanning control system may use the conveyor systems as the staging areas for a plurality of hides waiting for an available drum (e.g., the conveyor systems may transport the plurality of hides to drums that are expected to become available the soonest). Accordingly, the plurality of hides may be staged to be loaded into a drum immediately after that drum has been emptied. In this manner, one or more embodiments improve the usage of unloading systems and drums in the tanning facility.

Figure 6:
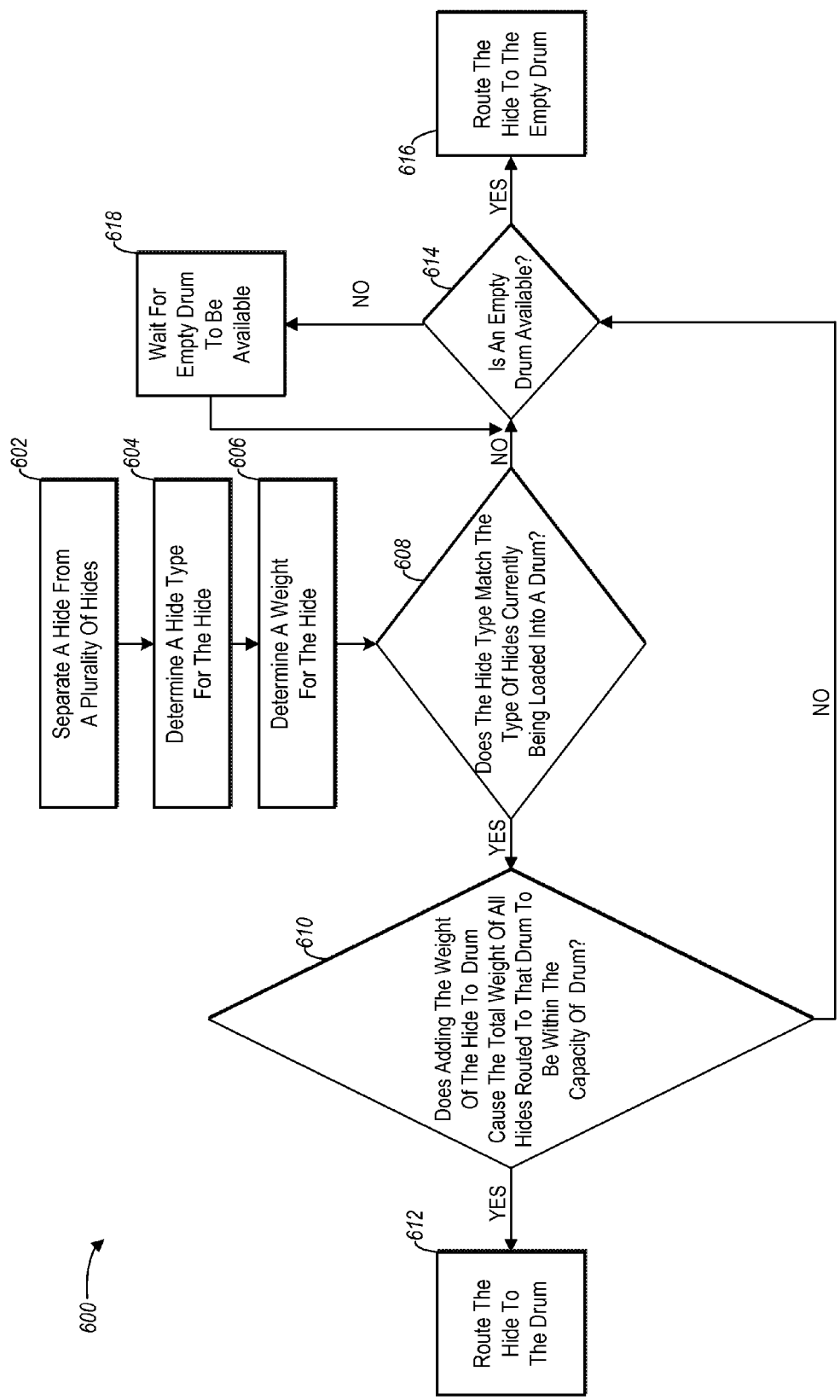
FIG. 6 illustrates a flowchart for separating and routing an individual hide to one or more drums in accordance with one or more embodiments.

FIG. 6 illustrates a flowchart for separating and routing an individual hide to one or more drums in accordance with one or more embodiments. More specifically, the flowchart 600 of FIG. 6 shows how to separate, assign, and route an individual hide to a particular drum based on the hide type of the individual hide and the weight of the individual hide.

As FIG. 6 shows, in one or more embodiments a tanning control system (e.g., tanning control system 302 of FIG. 3) separates a hide from a plurality of hides 602. For example, a separator (e.g., a knockdown wheel) may be used to separate an individual hide from a plurality of hides unloaded from a transport container. As another example, a user supervising an unloading system (e.g., unloading system 202 of FIG. 2) may manually separate an individual hide from a plurality of hides unloaded from a transport container. Thus, in one or more embodiments, once an individual hide is separated and isolated, the tanning control system can then determine the type of that hide, as well as the weight of that hide, to facilitate the routing and loading of that hide into a particular drum.

As FIG. 6 further illustrates, in one or more embodiments the tanning control system determines a hide type for the individual hide 604. For example, a user supervising an unloading system may input a hide type for the individual hide using a user interface associated with an unloading controller (e.g., unloading controller 212 of FIGS. 2 and 3). In turn, the unloading controller may provide the hide type to the tanning control system. As another example, tanning control system may determine a hide type for the individual hide by using sensors or other detectors that inspect the individual hide. As yet another example, tanning control system may determine a hide type for the individual hide by referencing hide supplier information associated with the individual hide, the transport container or transport vehicle that carried the hide, of the plant that generated the hide.

Furthermore, FIG. 6 shows that in one or more embodiments the tanning control system determines a weight for the individual hide 606. For example, tanning control system may determine the weight of the individual hide by receiving an indication of the weight from a measurer employed by an unloading system (e.g., measurer 218 at unloading site 214a of FIG. 2, which may be a weight scale). As another example, a user supervising an unloading system (e.g., unloading system 202 of FIG. 2) may measure the weight of the individual hide and provide the weight as user input into a user interface associated with an unloading controller (e.g., unloading controller 212 of FIGS. 2 and 3). Accordingly, the unloading controller may provide the weight of the individual hide to the tanning control system.

Moreover, FIG. 6 illustrates that in one or more embodiments the tanning control system determines whether the hide type of the individual hide matches the type of hides currently being loaded into a drum 608. For example, in one or more embodiments tanning control system (e.g., liming manager 322, chroming manager 326, and/or batch manager 330 of FIG. 3) may keep track of the hide type of hides currently loaded into one or more drums (i.e., liming drums or chroming drums). Thus, by tracking the hide type of hides currently loaded into drums, the tanning control system and assign and route hides of the same type to the same drum. Furthermore, grouping an individual hide with other hides of the same type improves the quality of tanned hides by facilitating the tailoring of tanning processes to batches of hides having a specific type and corresponding hide characteristics.

As shown by FIG. 6, if the hide type of the individual hide matches the type of hides currently loaded into a particular drum 608, then the tanning control system determines whether adding the weight of the individual hide to the particular drum will cause that drum to exceed its capacity 610. For example, in one or more embodiments tanning control system (e.g., liming manager 322, chroming manager 326, and/or batch manager 330 of FIG. 3) may keep track of the weight of each individual hide assigned and routed to a particular drum, as well as the total weight capacity of particular drums. Thus, by tracking the weight of each individual hide routed to particular drums and the total weight capacity of the drums, one or more embodiments can provide improved output through increased usage of available drum capacity.

Moreover, as FIG. 6 illustrates, if adding the weight of the individual hide to a particular drum will not cause that drum to exceed its capacity 610, then, in one or more embodiments the tanning control system routes the individual hide to that particular drum 612. For example, in one or more embodiments the tanning control system may communicate with and direct a conveyor system (e.g., one of conveyor systems 210a-210c of FIG. 2) to transport the individual hide to the designated drum.

However, as FIG. 6 also illustrates, if the hide type of the individual hide does not match the type of hides currently loaded into a particular drum 608 or if adding the weight of the individual hide to the particular drum will cause that drum to exceed its capacity 610, then, in one or more embodiments the tanning control system determines whether an empty drum is available 614 for the individual hide. As an example, the tanning control system may communicate with one or more weight sensors associated with the drums (e.g., scales or other load sensors) to determine which drums are empty. Further, the tanning control system may also check that no other hides have been assigned and routed to any of the drums determined to be empty.

As FIG. 6 shows, if an empty drum is available 614, then, in one or more embodiments the tanning control system routes the individual hide to one of the identified empty drums 616 (e.g., by communicating with and directing one or more conveyor systems). On the contrary, as FIG. 6 also shows, if an empty drum is not available 614, then, in one or more embodiments the tanning control system waits for an empty drum to be available 618. Once an empty drum becomes available, then the individual hide may be assigned and routed to that drum 616.

Moreover, in one or more embodiments as tanning control system waits for an empty drum to be available 618, tanning control system may route the individual hide to a staging area to facilitate continued unloading of transport containers by the unloading system (i.e., to avoid occupying an unloading site with numerous individual hides that are waiting for an available drum). Further, in one or more embodiments the tanning control system may use the conveyor systems as the staging areas for each individual hide waiting for an available drum (e.g., the conveyor systems may transport each individual hide to drums that are expected to become available the soonest). Thus, each individual hide may be staged to be loaded into a drum immediately after that drum has been emptied. As a result, one or more embodiments improve the usage of unloading systems and drums in the tanning facility.

In one or more embodiments, there may be a plurality of staging areas where a plurality of hides having the same characteristics are staged, and the tanning control system can monitor the total number of hides and total weight of the hides that are staged in each staging area. For example, a staging area may eventually include enough hides to make an entire batch. Thus, upon a drum becoming available, the tanning control system can route all of the hides from the staging area to the available drum and quickly start another batch in as little time as possible.

As one can appreciate from the foregoing description, the steps shown in the flowcharts of FIGS. 5 and 6 may be performed in a different order. For example, in one or more alternative embodiments of FIG. 5, the tanning control system may determine the weight of the plurality of hides before determining the type of the plurality hides. As another example, in one or more alternative embodiments of FIG. 6, the tanning control system may determine the weight of the individual hide before determining the type of the individual hide. As yet another example, in one or more alternative embodiments of FIG. 5, the tanning control system may determine whether adding the weight of the plurality of hides will cause a particular drum to exceed capacity before determining whether the hide type of the plurality of hides matches the type of hides currently loaded into a particular drum. As a further example, in one or more alternative embodiments of FIG. 6, the tanning control system may determine whether adding the weight of the individual hide will cause a particular drum to exceed capacity before determining whether the hide type of the individual hide matches the type of hides currently loaded into a particular drum.

Moreover, while FIGS. 5 and 6 illustrate that a tanning control system determines whether hide type of a plurality of hides or an individual hide matches the hide type of hides currently loaded into a particular drum, in one or more embodiments, the tanning control system may determine matching of the plurality of hides or the individual hide based on other hide characteristics. For example, in one or more alternative embodiments of FIG. 5, the plurality of hides may be routed by a tanning control system based on matching one or more hide characteristics of the plurality of hides that may or may not also include hide type (e.g., weight, weight range, average weight, surface area, surface area range, average surface area, density, density range, average density, associated plant identifier, associated transport vehicle identifier, associated container identifier, etc.). As another example, in one or more alternative embodiments of FIG. 6, the individual hide may be routed by a tanning control system based on matching one or more hide characteristics of the individual hide that may or may not also include hide type (e.g., weight, surface area, density, associated plant identifier, associated transport vehicle identifier, associated container identifier, etc.).

Also, while FIGS. 5 and 6 illustrate that a tanning control system determines whether adding the weight of a plurality of hides or an individual hide will cause a particular drum to exceed a weight capacity, in one or more embodiments, the tanning control system may determine whether adding the plurality of hides or the individual hide will cause a particular drum to exceed a capacity other than weight (e.g., hide number capacity, transport container capacity, transport vehicle capacity, etc.). For example, in one or more alternative embodiments of FIG. 5, the plurality of hides may be routed based on the tanning control system determining that adding the number of the plurality of hides will not cause a particular drum to exceed the total number of hides for which the drum has capacity. Along similar lines, in one or more alternative embodiments of FIG. 6, the individual hide may be routed based on the tanning control system determining that adding the individual hide will not cause a particular drum to exceed the total number of hides for which the drum has capacity.

Furthermore, as one can appreciate from the foregoing description, in one or more embodiments, one or more of the steps shown in the flowcharts of FIGS. 5 and 6 may be omitted. Additionally, in one or more embodiments, one or more additional steps or checks may be added. Moreover, as one can appreciate, the methods and systems described in the foregoing may be used to route a plurality of hides or an individual hide to one or more drums used to carry out the liming and/or chroming processes.

FIG. 7A illustrates a schematic scenario diagram for unloading, conveying, and routing hides to one or more liming drums in a tanning system in accordance with one or more embodiments. In particular, FIG. 7 illustrates portions of one example embodiment of system 100 of FIG. 1. More specifically, tanning system 700 illustrates portions of one embodiment of tanning system 104a. As shown by FIG. 7, tanning system 700 includes an unloading system 702, a conveyor system 704, and a liming system 706 having liming drums 708a-708d (e.g., unloading system 202, conveyor system 210a, and liming system 204 having liming drums 224a-224b of FIG. 2).

Furthermore, FIG. 7A illustrates a scenario in which the concepts of the flowchart shown in FIG. 5 may be used to route a plurality of hides to a liming drum. In one or more embodiments, unloading system 702 unloads a plurality of hides and conveyor system 704 transports the plurality of hides to one of the liming drums 708a-708d of liming system 706 in accordance with the flowchart shown in FIG. 5.

For example, if the plurality of hides have a determined hide type of "Jumbo" and a determined weight (e.g., in accordance with steps 502 and 504 of FIG. 5), then the plurality of hides may be routed to one of liming drums 708a, 708b, or 708c, each of which have a hide type of "Jumbo" for hides currently being loaded (e.g., in accordance with step 506 of FIG. 5). Given that liming drum 708a has a drum status of "Full" (e.g., the liming drum contains hides with an aggregate weight that meets the weight capacity of the liming drum), the plurality of hides will not be routed to liming drum 708a (e.g., in accordance with step 508 of FIG. 5).

Likewise, given liming drum 708c has a drum status of "Nearly Full" (e.g., the liming drum contains hides with an aggregate weight below the weight capacity of the liming drum, but with remaining capacity that is less than the weight of a plurality of hides) and assuming that adding the determined weight of the plurality of hides to liming drum 708c would exceed a drum capacity, the plurality of hides also will not be routed to liming drum 708c (e.g., in accordance with step 508 of FIG. 5).

However, given liming drum 708b has a drum status of "Partially Full" (e.g., the liming drum contains hides with an aggregate weight below the weight capacity of the liming drum and with remaining capacity for the weight of a plurality of hides), the plurality of hides will be routed to liming drum 708b (e.g., in accordance with steps 508 and 510 of FIG. 5).

As an alternative example, if the plurality of hides have a determined hide type of "Heifer" and a determined weight (e.g., in accordance with steps 502 and 504 of FIG. 5), then the plurality of hides may only be routed to liming drum 708d which has a hide type of "Unassigned" and a drum status of "Empty" (e.g., in accordance with steps 506, 512, and 514 of FIG. 5). As yet another example, assuming the plurality of hides cannot be routed to one of liming drums 708a-708d (e.g., because the hide type of the plurality of hides does not match or the weight of the plurality of hides causes the drums to exceed capacity), then the plurality of hides will wait to be routed to an empty drum (e.g., in accordance with steps 512 and 516 of FIG. 5).

Moreover, FIG. 7A illustrates a scenario in which the concepts of the flowchart shown in FIG. 6 may be used to route an individual hide to a liming drum. In one or more embodiments, unloading system 702 unloads an individual hide and conveyor system 704 transports the individual hide to one of the liming drums 708a-708d of liming system 706 in accordance with the flowchart shown in FIG. 6.

For example, if the individual hide is separated from a plurality of hides and has a determined hide type of "Jumbo" and a determined weight (e.g., in accordance with steps 602, 604, and 606 of FIG. 6), then the individual hide may be routed to one of liming drums 708a, 708b, or 708c, each of which have a hide type of "Jumbo" for hides currently being loaded (e.g., in accordance with step 608 of FIG. 6). Given that liming drum 708a has a drum status of "Full," the individual hide will not be routed to liming drum 708a (e.g., in accordance with step 610 of FIG. 6).

Likewise, given liming drum 708c has a drum status of "Nearly Full" (e.g., the liming drum contains hides with an aggregate weight below the weight capacity of the liming drum, but with remaining capacity that is less than the weight of an individual hide) and assuming that adding the determined weight of the individual hide to liming drum 708c would make that drum exceed its capacity, the individual hide also will not be routed to liming drum 708c (e.g., in accordance with step 610 of FIG. 6). However, given liming drum 708b has a drum status of "Partially Full" (e.g., the liming drum contains hides with an aggregate weight below the weight capacity of the liming drum and with remaining capacity for the weight of an individual hide), the individual hide will be routed to liming drum 708b (e.g., in accordance with steps 610 and 612 of FIG. 6).

As another example, if the individual hide has a determined hide type of "Steer" and a determined weight (e.g., in accordance with steps 604 and 606 of FIG. 6), then the individual hide may only be routed to liming drum 708d which has a hide type of "Unassigned" and a drum status of "Empty" (e.g., in accordance with steps 608, 614, and 616 of FIG. 6). As a further example, assuming the individual hide cannot be routed to one of liming drums 708a-708d (e.g., because the hide type of the individual hides does not match or the weight of the individual hide causes the drums to exceed capacity), then the individual hide will wait to be routed to an empty drum (e.g., in accordance with steps 614 and 618 of FIG. 6).

Figure 7B:
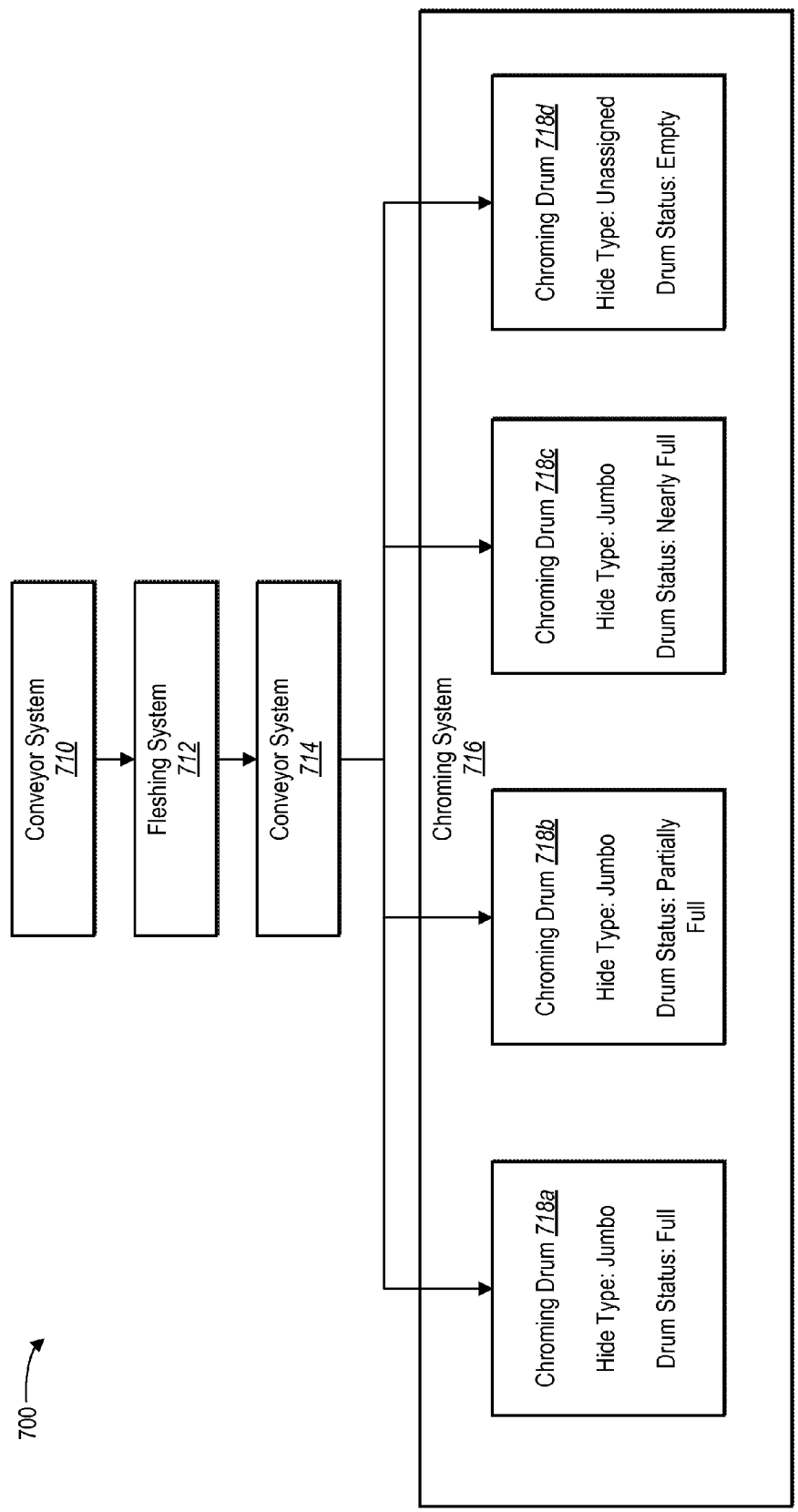
FIG. 7B illustrates a schematic diagram for conveying, fleshing, and routing hides to one or more chroming drums in a tanning system in accordance with one or more embodiments.

FIG. 7B illustrates a schematic scenario diagram for conveying, fleshing, and routing hides to one or more chroming drums in a tanning system in accordance with one or more embodiments. In particular, FIG. 7B illustrates portions of one example embodiment of system 100 of FIG. 1. More specifically, tanning system 700 illustrates portions of one embodiment of tanning system 104a. As shown by FIG. 7B, tanning system 700 includes a conveyor system 710, a fleshing system 712, a conveyor system 714, and a chroming system 716 having chroming drums 718a-718d (e.g., conveyor system 210b, fleshing system 206, conveyor system 210c, and chroming system 208 having chroming drums 232a-232b of FIG. 2).

Moreover, FIG. 7B illustrates a scenario in which the concepts of the flowchart shown in FIG. 5 may be used to route a plurality of hides to a chroming drum. In one or more embodiments, conveyor system 710 transports a plurality of hides from a liming drum (e.g., one of liming drums 708a-708d in liming system 706 of FIG. 7A), then fleshing system 712 defleshes the plurality of hides, then conveyor system 714 transports the plurality of hides to one of the chroming drums 718a-718d of chroming system 716 in accordance with the flowchart shown in FIG. 5.

As an example, if the plurality of hides have a determined hide type of "Jumbo" and a determined weight (e.g., in accordance with steps 502 and 504 of FIG. 5), then the plurality of hides may be routed to one of chroming drums 718*a*, 718*b*, or 718*c*, each of which have a hide type of "Jumbo" for hides currently being loaded (e.g., in accordance with step 506 of FIG. 5). Given that chroming drum 718*a* has a drum status of "Full" (e.g., the chroming drum contains hides with an aggregate weight that meets the weight capacity of the chroming drum), the plurality of hides will not be routed to liming drum 718*a* (e.g., in accordance with step 508 of FIG. 5). Likewise, given chroming drum 718*c* has a drum status of "Nearly Full" (e.g., the chroming drum contains hides with an aggregate weight below the weight capacity of the chroming drum, but with remaining capacity that is less than the weight of a plurality of hides) and assuming that adding the determined weight of the plurality of hides to chroming drum 718*c* would make that drum exceed its capacity, the plurality of hides also will not be routed to chroming drum 718*c* (e.g., in accordance with step 508 of FIG. 5). However, given chroming drum 718*b* has a drum status of "Partially Full" (e.g., the chroming drum contains hides with an aggregate weight below the weight capacity of the chroming drum and with remaining capacity for the weight of a plurality of hides), the plurality of hides will be routed to chroming drum 718*b* (e.g., in accordance with steps 508 and 510 of FIG. 5).

As a different example, if the plurality of hides have a determined hide type of "Steer" and a determined weight (e.g., in accordance with steps 502 and 504 of FIG. 5), then the plurality of hides may only be routed to chroming drum 718*d* which has a hide type of "Unassigned" and a drum status of "Empty" (e.g., in accordance with steps 506, 512, and 514 of FIG. 5). As another example, assuming the plurality of hides cannot be routed to one of chroming drums 718*a*-718*d* (e.g., because the hide type of the plurality of hides does not match or the weight of the plurality of hides causes the drums to exceed capacity), then the plurality of hides will wait to be routed to an empty drum (e.g., in accordance with steps 512 and 516 of FIG. 5).

FIG. 7B also illustrates a scenario in which the concepts of the flowchart shown in FIG. 6 may be used to route an individual hide to a chroming drum. In one or more embodiments, conveyor system 710 transports an individual hide from a liming drum (e.g., one of liming drums 708*a*-708*d* in liming system 706 of FIG. 7A), then fleshing system 712 defleshes the individual hide, then conveyor system 714 transports the individual hide to one of the chroming drums 718*a*-718*d* of chroming system 716 in accordance with the flowchart shown in FIG. 6.

For example, if the individual hide is separated from a plurality of hides and has a determined hide type of "Jumbo" and a determined weight (e.g., in accordance with steps 602, 604, and 606 of FIG. 6), then the individual hide may be routed to one of chroming drums 718*a*, 718*b*, or 718*c*, each of which have a hide type of "Jumbo" for hides currently being loaded (e.g., in accordance with step 608 of FIG. 6). Given that chroming drum 718*a* has a drum status of "Full," the individual hide will not be routed to chroming drum 718*a* (e.g., in accordance with step 610 of FIG. 6). Likewise, given chroming drum 718*c* has a drum status of "Nearly Full" (e.g., the chroming drum contains hides with an aggregate weight below the weight capacity of the chroming drum, but with remaining capacity that is less than the weight of an individual hide) and assuming that adding the determined weight of the individual hide to chroming drum 718*c* would make that drum exceed its capacity, the individual hide also will not be routed to chroming drum 718*c* (e.g., in accordance with step 610 of FIG. 6). However, given chroming drum 718*b* has a drum status of "Partially Full" (e.g., the chroming drum contains hides with an aggregate weight below the weight capacity of the chroming drum and with remaining capacity for the weight of an individual hide), the individual hide will be routed to chroming drum 718*b* (e.g., in accordance with steps 610 and 612 of FIG. 6).

As a different example, if the individual hide has a determined hide type of "Heifer" and a determined weight (e.g., in accordance with steps 604 and 606 of FIG. 6), then the individual hide may only be routed to chroming drum 718*d* which has a hide type of "Unassigned" and a drum status of "Empty" (e.g., in accordance with steps 608, 614, and 616 of FIG. 6). As a further example, assuming the individual hide cannot be routed to one of chroming drums 718*a*-718*d* (e.g., because the hide type of the individual hides does not match or the weight of the individual hide causes the drums to exceed capacity), then the individual hide will wait to be routed to an empty drum (e.g., in accordance with steps 614 and 618 of FIG. 6).

FIGS. 1-7B, the corresponding text, and the examples, provide a number of different systems and devices for routing hides. In addition to the foregoing, embodiments also can be described in terms of flowcharts comprising acts and steps in a method for accomplishing a particular result. For example, FIGS. 8-9 illustrate flowcharts of exemplary methods in accordance with one or more embodiments.

Figure 8:
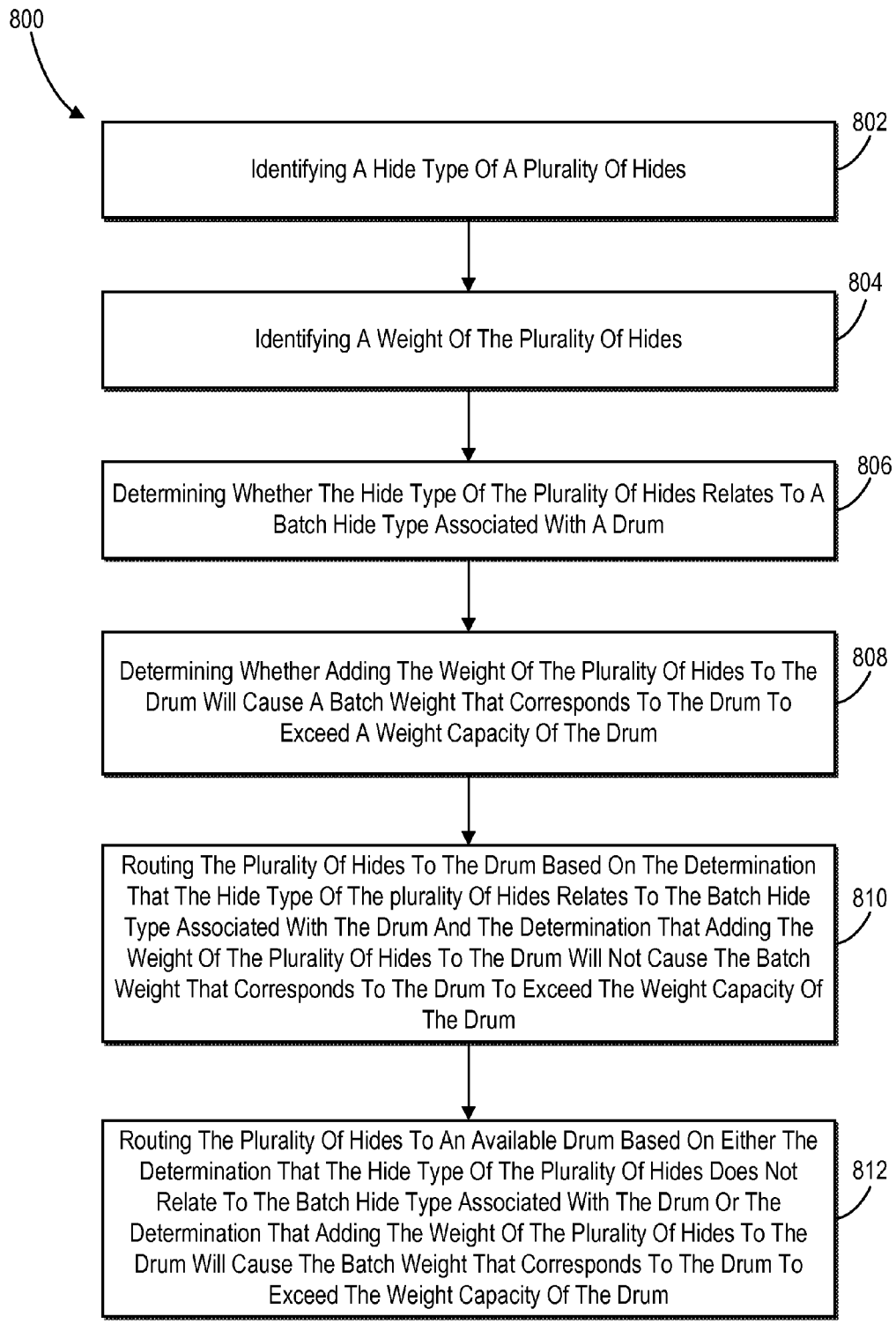
FIG. 8 illustrates a flowchart of a series of acts in a method of processing raw animal hides into leather in accordance with one or more embodiments.
Figure 9:
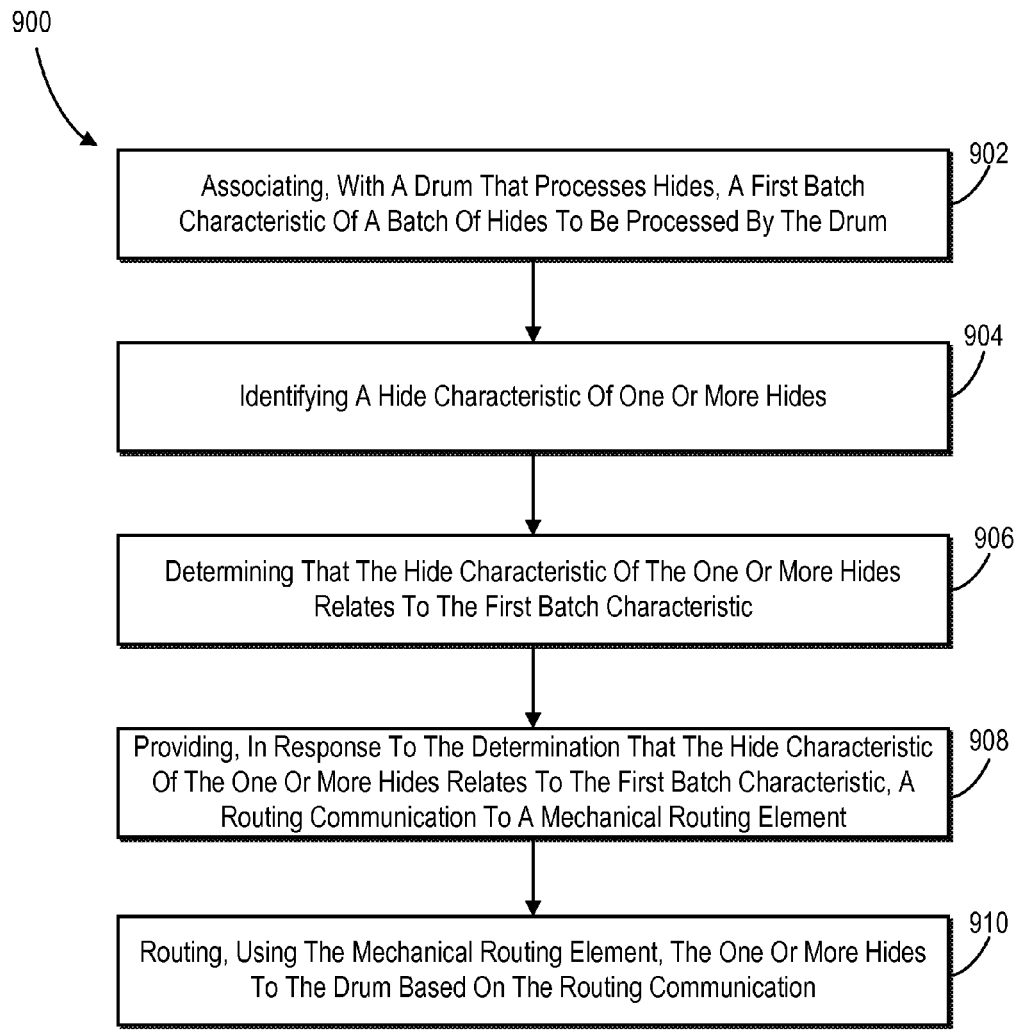
FIG. 9 illustrates a flowchart of a series of acts in a method of processing raw animal hides into leather in accordance with one or more embodiments.

FIG. 8 illustrates a flowchart of one exemplary method 800 of routing hides from the perspective of a tanning system 104*a* or a tanning manager 318 of a tanning control system 302. The method 800 can include an act 802 of identifying a hide type of a plurality of hides. In particular, act 802 can comprise identifying a hide type of the plurality of hides by looking up the hide type in a table, database, or other suitable data structure stored in a computing device, such as computing devices 304 or 318. Further, act 802 can comprise receiving a detected hide type of a plurality of hides.

In one or more embodiments, one or more sensors connected to a computing device associated with an unloading site of tanning system 104*a* may automatically detect the hide type of the plurality of hides and send the detected hide type to tanning manager 318. The one or more sensors may detect the hide type of the plurality of hides before the hides are unloaded, while the hides are unloaded, or after the hides have been unloaded from a transport container. Alternatively, act 802 can comprise receiving a user-input-based hide type of a plurality of hides. More specifically, tanning manager 318 may receive a hide type of a plurality of hides, wherein the hide type was input by a user (e.g., user 314) into a computing device associated with an unloading site.

The method 800 may also include an act 804 of identifying a weight of the plurality of hides. In particular, act 802 can comprise identifying a weight of the plurality of hides by looking up the weight in a table, database, or other suitable data structure stored in a computing device, such as computing devices 304 or 318. Further, act 802 can comprise receiving a detected weight of a plurality of hides. In one or more embodiments, one or more sensors (e.g., a weight scale) connected to a computing device associated with an unloading site of tanning system 104*a* may automatically detect the weight of the plurality of hides and send the detected weight to tanning manager 318. Alternatively, act 804 can comprise receiving a user-input-based weight of the plurality of hides. More specifically, tanning manager 318 may receive a weight of a plurality of hides, wherein the weight was input by a user (e.g., user 314) into a computing device associated with an unloading site.

FIG. 8 further illustrates that the method 800 can include an act 806 of determining whether the hide type of the plurality of hides relates to a batch hide type associated with a drum. In particular, act 806 can comprise comparing the hide type of the plurality of hides with the batch hide type associated with one or more drums. More specifically, tanning manager 318 can look up a mapping of batch hide types to drums stored in a table, database, or other suitable data structure, such as batch database 332 or the table shown in FIG. 4. Tanning manager 318 may then compare the hide type of the plurality of hides to the batch hide types to determine whether they are compatible. If the hide type and the batch hide type are related, then the plurality of hides may be routed to the drum. Otherwise, if the hide type and batch hide type are not related, then the plurality of hides may not be routed to the drum. In one or more embodiments, a hide type of a plurality of hides may be compatible or related to a batch hide type if they are the same. In other embodiments, a hide type of a plurality of hides may be compatible or related to a batch hide type if hides having the hide type and hides having the batch hide type are capable of being processed together, despite being different types altogether (i.e., processing a batch of hides that comprises two or more hide types).

Further, the method 800 can include an act 808 of determining whether adding the weight of the plurality of hides to the drum will cause a batch weight that corresponds to the drum to exceed a weight capacity of the drum. In particular, act 808 can comprise comparing the weight capacity of the drum to the sum of the weight of the plurality of hides and the batch weight that corresponds to the drum. If the weight capacity of the drum is greater than or equal to the sum, then the plurality of hides may be routed to the drum. Otherwise, if the weight capacity of the drum is less than the sum, then the plurality of hides may not be routed to the drum. Moreover, act 806 can comprise tracking and adding the respective weights of each plurality of hides routed to each drum to determine the batch weights that correspond to the hide batches assigned to each drum. In one or more embodiments, the batch weight that corresponds to each drum and the weight capacity of each drum can be stored in a table, database, or other suitable data structure, such as batch database 332 or the table shown in FIG. 4.

Moreover, the method 800 can include an act 810 of routing the plurality of hides to the drum based on the determination that the hide type of the plurality of hides relates to the batch hide type associated with the drum and the determination that adding the weight of the plurality of hides to the drum will not cause the batch weight that corresponds to the drum to exceed the weight capacity of the drum. In particular, act 810 can comprise sending a routing communication to a mechanical routing element, such as a conveyor system. The routing communication may include an identifier associated with the plurality of hides and an indication of the drum (i.e., the target drum) to which the plurality hides are to be routed. Further, act 810 can comprise sending a plurality of routing communications that facilitate the transfer of the plurality of hides to the drum. In one or more embodiments, the plurality of routing communications may include control signals that direct one or more conveyor systems to transport the plurality of hides to the drum.

FIG. 8 also illustrates that the method 800 can include an act 812 of routing the plurality of hides to an available drum based on either the determination that the hide type of the plurality of hides does not relate to the batch hide type associated with the drum or the determination that adding the weight of the plurality of hides to the drum will cause the batch weight that corresponds to the drum to exceed the weight capacity of the drum. In particular, act 812 can comprise sending a routing communication to a mechanical routing element, such as a conveyor system. The routing communication may include an identifier associated with the plurality of hides and an indication of the available drum to which the plurality hides are to be routed. Further, act 810 can comprise sending a plurality of routing communications that facilitate the transfer of the plurality of hides to the available drum. In one or more embodiments, the plurality of routing communications may include control signals that direct one or more conveyor systems to transport the plurality of hides to the available drum.

Referring now to FIG. 9, a flowchart of one exemplary method 900 of routing hides from the perspective of a tanning system 104a or a tanning manager 318 of a tanning control system 302 is illustrated. As shown, the method 900 can include an act 902 of associating, with a drum that processes hides, a first batch characteristic of a batch of hides to be processed by the drum. In particular, act 902 can comprise determining that a drum status corresponding to the drum is unassigned and/or empty and then associating the first batch characteristic to the drum based on that determination. Further, act 902 can comprise receiving a detected hide characteristic of at least one hide and then associating the first batch characteristic with the drum, wherein the first batch characteristic and the detected hide characteristic are the same, related, or otherwise compatible. In one or more embodiments, one or more sensors connected to a computing device associated with an unloading site of tanning system 104a may automatically detect the detected hide characteristic of the at least one hide and send the detected hide characteristic to tanning manager 318. Moreover, act 902 can comprise receiving user input that specifies the first batch characteristic to be associated with the drum. For example, a user may interact with computing device(s) 316 to provide user input that specifies a first batch characteristic and a drum, and tanning manager 318 may then use this input to associate the first batch characteristic with the drum. Additionally, act 902 can comprise storing the association of the first batch characteristic and the drum in a table, database, or other suitable data structure, such as batch database 332 or the table shown in FIG. 4.

The method 900 can also include an act 904 of identifying a hide characteristic of one or more hides. In particular, act 904 can comprise identifying a hide characteristic of one or more hides by receiving an indication of the hide characteristic as detected by one or more sensors associated with a computing device of an unloading site. Further, act 904 can comprise looking up the hide characteristic in a table, database, or other suitable data structure of a computing device, such as computing device(s) 316. Examples of a hide characteristic include, but are not limited to, hide weight, hide size, or hide type, among others.

Further, FIG. 9 illustrates that method 900 can include an act 906 of determining that the hide characteristic of the one or more hides relates to the first batch characteristic. In particular, act 906 can comprise determining that the hide characteristic of the one or more hides and the first batch characteristic are the same. Alternatively, act 906 can comprise determining that the hide characteristic of the one or more hides and the first batch characteristic are compatible. For example, the hide characteristic and the first batch characteristic may be different, but hides having the hide characteristic may be processed together with hides having the first batch characteristic (e.g., processing "Steer" and "Heifer" type hides together in a "Steer" batch, while not processing "Jumbo" type hides in that same batch). Moreover, act 906 can comprise comparing the hide characteristic to the first batch characteristic. For example, tanning manager 318 running on computing device(s) 316 may perform this comparison.

Moreover, method 900 can include an act 908 of providing, in response to the determination that the hide characteristic of the one or more hides relates to the first batch characteristic, a routing communication to a mechanical routing element. In particular, act 908 can comprise sending a routing communication to a computing device associated with a mechanical routing element (e.g., computing device 312 running conveyor controller 234 associated with conveyor systems 210a-210c of tanning system 104a). The routing communication can include an identification of the one or more hides and an identification of the drum to which the one or more hides are to be routed. Further, in one or more embodiments, act 908 can comprise providing a routing communication that includes control signals for directing a mechanical routing element to transport the one or more hides to the drum. Examples of mechanical routing elements include, but are not limited to, conveyors.

Furthermore, method 900 can include an act 910 of routing, using the mechanical routing element, the one or more hides to the drum based on the routing communication. In particular, act 910 can comprise transporting the one or more hides from unloading system 202 to liming system 204 using a conveyor system, such as conveyor system 210a. Further, act 910 can comprise transporting the one or more hides from liming system 204 to chroming system 208 using one or more conveyor systems (e.g., conveyor systems 210b-210c). Moreover, in one or more embodiments, act 910 can comprise performing the routing communication at a computing device associated with the mechanical routing element (e.g., computing device 312 running conveyor controller 234 associated with conveyor systems 210a-210c).

Embodiments may comprise or use a special purpose or general-purpose computer including computer hardware, such as, for example, one or more processors and system memory, as discussed in greater detail below. Embodiments within the scope also include physical and other computer-readable media for carrying or storing computer-executable instructions and/or data structures. In certain particular embodiments, one or more of the processes described herein may be implemented at least in part as instructions embodied in a non-transitory computer-readable medium and executable by one or more computing devices (e.g., any of the media content access devices described herein). In general, a processor (e.g., a microprocessor, etc.) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, one or more embodiments can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) use transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of one or more embodiments. The computer executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the one or more embodiments may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. One or more embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service (SaaS), Platform as a Service (PaaS), and Infrastructure as a Service (IaaS). A cloud computing model can also be deployed using different deployment models such as private cloud, community cloud, public cloud, hybrid cloud, and so forth. In this description and in the claims, a "cloud computing environment" is an environment in which cloud computing is employed.

Figure 10:
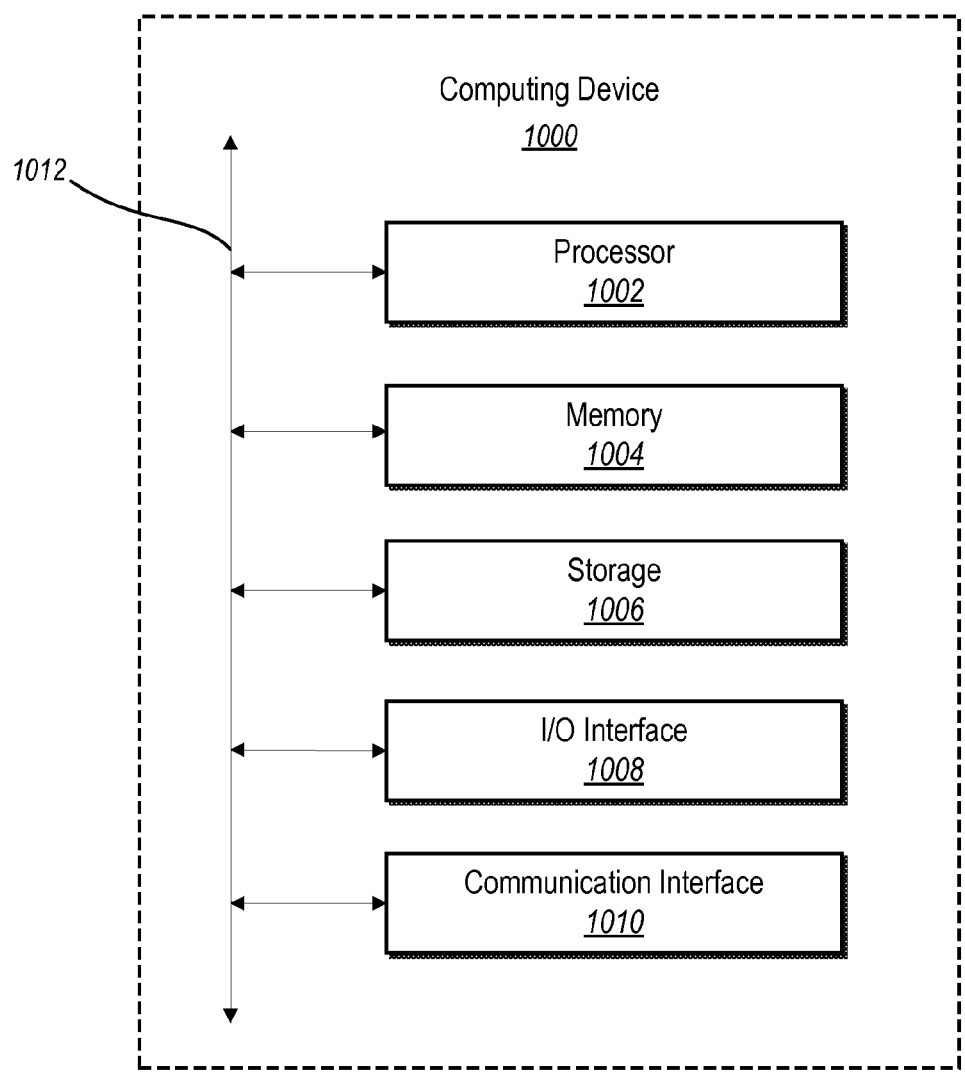
FIG. 10 illustrates a schematic block diagram of an exemplary computing device in accordance with one or more embodiments.

FIG. 10 illustrates, in block diagram form, an exemplary computing device 1000 that may be configured to perform one or more of the processes described above. One will appreciate that the computing devices 304-312 and 318 can each comprise implementations of the data-computing device 1000. As shown by FIG. 10, the computing device can comprise a processor 1002, memory 1004, a storage device 1006, an I/O interface 1008, and a communication interface 1010. While an exemplary computing device 1000 is shown in FIG. 10, the components illustrated in FIG. 10 are not intended to be limiting. Additional or alternative components may be used in other embodiments. Furthermore, in certain embodiments, a computing device 1000 can include fewer components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them. In particular embodiments, processor(s) 1002 may include one or more internal caches for data, instructions, or addresses. As an example and not by way of limitation, processor(s) 1002 may include one or more instruction caches, one or more data caches, and one or more translation lookaside buffers (TLBs). Instructions in the instruction caches may be copies of instructions in memory 1004 or storage device 1006.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory (RAM), Read Only Memory (ROM), a solid state disk (SSD), flash, Phase Change Memory (PCM), or other types of data storage. The memory 1004 may be internal or distributed memory.

The computing device 1000 includes a storage device 1006 for storing data or instructions. As an example and not by way of limitation, storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to the computing device 1000. In particular embodiments, storage device 1006 is non-volatile, solid-state memory. In particular embodiments, storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory, or a combination of two or more of these.

The computing device 1000 also includes one or more input or output (I/O) devices/interfaces 1008, which are provided to allow a user to provide input to, receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device 1000 and one or more other computing devices or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1010. As an example and not by way of limitation, computing device 1000 may communicate with an ad hoc network, a personal area network (PAN), a local area network (LAN), a wide area network (WAN), a metropolitan area network (MAN), or one or more portions of the Internet, or a combination of two or more of these. One or more portions of one or more of these networks may be wired or wireless. As an example, computing system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1000 may include any suitable communication interface 1010 for any of these networks, where appropriate.

The computing device 1000 can further include a bus 1012. The bus 1012 can comprise hardware, software, or both that couples components of computing device 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, various embodiments have been described with reference to specific exemplary embodiments thereof. Various embodiments and aspects are described with reference to details discussed herein, and the accompanying drawings illustrate the various embodiments. The description above and drawings are illustrative and are not to be construed as limiting. Numerous specific details are described to provide a thorough understanding of various embodiments.

One or more embodiments may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A method of routing hides comprising:
identifying a hide type of a plurality of hides;
identifying a weight of the plurality of hides;
determining, using at least one processor, whether the hide type of the plurality of hides relates to a batch hide type associated with a drum;
determining whether adding the weight of the plurality of hides to the drum will cause a batch weight that corresponds to the drum to exceed a weight capacity of the drum;
routing, using the at least one processor, the plurality of hides to the drum based on the determination that the hide type of the plurality of hides relates to the batch hide type associated with the drum and the determination that adding the weight of the plurality of hides to the drum will not cause the batch weight that corresponds to the drum to exceed the weight capacity of the drum;
routing, using the at least one processor, the plurality of hides to an available drum based on either the determination that the hide type of the plurality of hides does not relate to the batch hide type associated with the drum or the determination that adding the weight of the plurality of hides to the drum will cause the batch weight that corresponds to the drum to exceed the weight capacity of the drum; determining a batch characteristic associated with a hide batch that includes a plurality of hides; determining a liming recipe based at least in part on the batch characteristic;
applying a liming process to the hide batch in accordance with the liming recipe; and
applying a chroming process to the hide batch subsequent to the application of the liming process.

2. The method as recited in claim 1, further comprising:
determining that a batch hide type associated with the available drum is unassigned; and
associating the hide type of the plurality of hides with the available drum.

3. The method as recited in claim 1, further comprising separating the plurality of hides into individual hides, wherein each individual hide is routed to the drum to which the plurality of hides are routed.

4. The method as recited in claim 1, further comprising:
determining a hide count of the plurality of hides;
adding the hide count of the plurality of hides to a batch hide count that corresponds to the drum to which the plurality of hides are routed; and
storing the batch hide count in a batch database.

5. The method as recited in claim 1, further comprising determining a liming recipe based at least in part on a first batch weight of the hide batch determined prior to the application of the liming process, wherein the liming process is performed in accordance with the liming recipe.

6. The method as recited in claim 5, further comprising determining a chroming recipe based at least in part on a second batch weight of the hide batch determined subsequent to the application of the liming process, wherein the chroming process is performed in accordance with the chroming recipe.

7. The method as recited in claim 1, wherein the hide type of the plurality of hides comprises one of heifer, jumbo, or steer.

8. A method of routing hides comprising:
identifying a hide characteristic of one or more hides;
determining, using at least one processor, that the hide characteristic of the one or more hides relates to a first batch characteristic associated with a drum;
routing, using the at least one processor, the one or more hides to the drum based on the determination that the hide characteristic of the one or more hides relates to the first batch characteristic associated with the drum;
determining a second batch characteristic associated with the drum;
determining a liming recipe based at least in part on the second batch characteristic; and
applying a liming process to the one or more hides in accordance with the liming recipe.

9. The method as recited in claim 8, wherein the hide characteristic of the one or more hides comprises a hide type of the one or more hides, the first batch characteristic comprises a hide type of a batch of hides, and the second batch characteristic comprises a batch weight of the batch of hides determined prior to the application of the liming process to the batch of hides.

10. The method as recited in claim 8, further comprising:
determining a third batch characteristic associated with the drum;
determining a chroming recipe based at least in part on the third batch characteristic; and
applying a chroming process to the one or more hides in accordance with the chroming recipe.

11. The method as recited in claim 10, wherein the third batch characteristic comprises a batch weight of a batch of hides determined subsequent to the application of the liming process to the one or more hides.

12. The method as recited in claim 10, wherein the first batch characteristic comprises one of a hide type of a batch of hides, one or more container identifiers associated with the batch of hides, a transport vehicle identifier associated with the batch of hides, or a plant identifier associated with the batch of hides.

13. The method as recited in claim 8, wherein routing the one or more hides to the drum based on the determination that the hide characteristic of the one or more hides relates to the first batch characteristic associated with the drum further comprises using a conveyor system.

* * * * *